United States Patent
Blank

(10) Patent No.: US 11,789,413 B2
(45) Date of Patent: Oct. 17, 2023

(54) SELF-LEARNING CONTROL SYSTEM FOR A MOBILE MACHINE

(71) Applicant: Deere & Company, Moline, IL (US)

(72) Inventor: Sebastian Blank, Moline, IL (US)

(73) Assignee: Deere & Company, Moline, IL (US)

( * ) Notice: Subject to any disclaimer, the term of this patent is extended or adjusted under 35 U.S.C. 154(b) by 778 days.

(21) Appl. No.: 16/246,818

(22) Filed: Jan. 14, 2019

(65) Prior Publication Data

US 2019/0146426 A1 May 16, 2019

Related U.S. Application Data

(63) Continuation-in-part of application No. 15/983,456, filed on May 18, 2018, now Pat. No. 11,589,507.
(Continued)

(51) Int. Cl.
*G05B 15/00* (2006.01)
*G05B 13/02* (2006.01)
(Continued)

(52) U.S. Cl.
CPC ......... *G05B 13/028* (2013.01); *A01D 41/127* (2013.01); *G05D 1/0011* (2013.01)

(58) Field of Classification Search
CPC ........ G06F 30/20; G06F 16/22; G06F 3/0482; G06F 3/041; G06F 3/04817; G06F 3/0488; G06F 16/2455; G06F 16/93; G06F 2111/10; G06F 21/335; G06F 21/34; G06F 21/6272; G06F 21/72; G06F 2221/2105; G06F 2221/2115; G06F 2221/2141;
(Continued)

(56) References Cited

U.S. PATENT DOCUMENTS 4,951,031 A 8/1990 Strubbe
5,585,757 A 12/1996 Frey
(Continued)

FOREIGN PATENT DOCUMENTS

CN 101622928 A 1/2010
DE 10 2006 007 753 A1 10/2006
(Continued)

OTHER PUBLICATIONS

U.S. Appl. No. 15/626,972 Notice of Allowance dated Feb. 26, 2020, 9 pages.
(Continued)

*Primary Examiner* — Rayeez R Chowdhury
(74) *Attorney, Agent, or Firm* — Joseph R. Kelly; Kelly, Holt & Christenson PLLC

(57) ABSTRACT

Machine data is obtained indicating a number of times that a control rule is triggered on a mobile machine, along with an indication as to whether the control operation corresponding to the control rule was implemented and a performance result of that implementation. Effectiveness analyzer logic identifies an effectiveness of the control rule and machine learning logic generates a rating for the rule, based on its effectiveness. A rule modification engine is automatically controlled to make any control rule modifications, and a synchronization engine updates the modified control rules with control rules on the mobile machine.

15 Claims, 16 Drawing Sheets

Related U.S. Application Data which is a continuation-in-part of application No. 15/626,967, filed on Jun. 19, 2017, now Pat. No. 10,437,243.

(51) Int. Cl.
*A01D 41/127* (2006.01)
*G05D 1/00* (2006.01)

(58) Field of Classification Search
CPC ..... G06F 2221/2149; G06F 2221/2153; G06F 16/29; G06F 3/011; G06F 16/90344
See application file for complete search history.

(56) References Cited

U.S. PATENT DOCUMENTS

| | | | |
|---|---|---|---|
| 5,679,094 | A | 10/1997 | Nakamura et al. |
| 5,734,849 | A | 3/1998 | Butcher |
| 5,751,199 | A | 5/1998 | Shiau et al. |
| 5,755,281 | A | 5/1998 | Kang et al. |
| 6,449,932 | B1 | 9/2002 | Cooper et al. |
| 6,553,300 | B2 | 4/2003 | Ma et al. |
| 6,726,559 | B2 | 4/2004 | Bischoff |
| 6,990,459 | B2 | 1/2006 | Schneider |
| 6,999,877 | B1 | 2/2006 | Dyer |
| 7,047,135 | B2 | 5/2006 | Dyer |
| 7,164,992 | B1 | 1/2007 | Mulligan et al. |
| 7,184,892 | B1 | 2/2007 | Dyer |
| 7,333,922 | B2 | 2/2008 | Cannon |
| 7,364,003 | B2 | 4/2008 | Holt et al. |
| 7,397,392 | B2 | 7/2008 | Mahoney et al. |
| 7,853,384 | B2 | 12/2010 | Johnson |
| 8,280,595 | B2 | 10/2012 | Foster et al. |
| 8,469,784 | B1 | 6/2013 | Hoskinson |
| 8,948,975 | B2 | 2/2015 | Peterson et al. |
| 9,330,062 | B2 | 5/2016 | Thurow et al. |
| 9,403,536 | B2 | 8/2016 | Bollin et al. |
| 9,707,972 | B2 | 7/2017 | Tuncer et al. |
| 9,715,231 | B2 | 7/2017 | Kuniyasu et al. |
| 9,809,956 | B1 | 11/2017 | Sherlock |
| 9,892,376 | B2 * | 2/2018 | Pfeiffer ............ G06Q 10/06393 |
| 10,095,241 | B2 | 10/2018 | Nakagawa |
| 10,310,450 | B2 | 6/2019 | Falkenberg et al. |
| 10,310,455 | B2 | 6/2019 | Blank |
| 10,310,456 | B2 | 6/2019 | Caldwell et al. |
| 10,311,527 | B2 | 6/2019 | Pfeiffer |
| 10,782,672 | B2 | 9/2020 | Blank et al. |
| 2002/0040300 | A1 | 4/2002 | Ell |
| 2002/0103688 | A1 | 8/2002 | Schneider |
| 2003/0014171 | A1 * | 1/2003 | Ma .................. A01D 41/127 |
| | | | 701/50 |
| 2003/0114966 | A1 | 6/2003 | Ferguson et al. |
| 2003/0161906 | A1 | 8/2003 | Brauhardt et al. |
| 2004/0024510 | A1 | 2/2004 | Finley et al. |
| 2005/0150202 | A1 | 7/2005 | Quick |
| 2005/0171660 | A1 | 8/2005 | Woodford |
| 2005/0171835 | A1 | 8/2005 | Mook et al. |
| 2005/0258259 | A1 | 11/2005 | Stanimirovic |
| 2006/0187048 | A1 | 8/2006 | Curkendall et al. |
| 2006/0191692 | A1 | 8/2006 | Holt et al. |
| 2006/0241838 | A1 * | 10/2006 | Mongiardo ............ B60K 35/00 |
| | | | 701/50 |
| 2006/0287792 | A1 | 12/2006 | Jarrett |
| 2006/0293913 | A1 | 12/2006 | Iwig et al. |
| 2007/0156318 | A1 | 7/2007 | Anderson |
| 2007/0192173 | A1 | 8/2007 | Moughler |
| 2008/0319927 | A1 | 12/2008 | Dellmier et al. |
| 2009/0036184 | A1 | 2/2009 | Craessaerts et al. |
| 2009/0259483 | A1 | 10/2009 | Hendrickson |
| 2009/0299568 | A1 | 12/2009 | Schlingmann et al. |
| 2009/0312919 | A1 | 12/2009 | Foster |
| 2010/0036696 | A1 * | 2/2010 | Lang .................. A01B 79/005 |
| | | | 702/182 |
| 2010/0071329 | A1 | 3/2010 | Hindryckx et al. |
| 2010/0153409 | A1 | 6/2010 | Joshi et al. |
| 2010/0199257 | A1 | 8/2010 | Biggerstaff |
| 2010/0217481 | A1 | 8/2010 | Baumgarten et al. |
| 2010/0217631 | A1 | 8/2010 | Boss et al. |
| 2011/0251752 | A1 | 10/2011 | DeLarocheliere et al. |
| 2011/0270495 | A1 | 11/2011 | Knapp |
| 2012/0038544 | A1 | 2/2012 | Chen |
| 2012/0151055 | A1 | 6/2012 | Kansal |
| 2012/0215395 | A1 | 8/2012 | Aznavorian et al. |
| 2012/0253709 | A1 | 10/2012 | Schmidt et al. |
| 2012/0253744 | A1 | 10/2012 | Schmidt |
| 2012/0260366 | A1 | 12/2012 | Heuvelmans |
| 2012/0323453 | A1 | 12/2012 | Havimaki et al. |
| 2012/0323496 | A1 | 12/2012 | Burroughs et al. |
| 2013/0116883 | A1 | 5/2013 | Kormann |
| 2013/0289832 | A1 | 10/2013 | Pirotais |
| 2013/0317872 | A1 | 11/2013 | Nakamichi |
| 2014/0019018 | A1 | 1/2014 | Baumgarten et al. |
| 2014/0025440 | A1 | 1/2014 | Nagda et al. |
| 2014/0069035 | A1 | 3/2014 | Collins et al. |
| 2014/0089035 | A1 * | 3/2014 | Jericho .................. G07C 5/008 |
| | | | 705/7.11 |
| 2014/0122147 | A1 | 5/2014 | Christie et al. |
| 2014/0129048 | A1 | 5/2014 | Baumgarten et al. |
| 2014/0156105 | A1 | 6/2014 | Faivre et al. |
| 2014/0172247 | A1 | 6/2014 | Thomson |
| 2014/0188576 | A1 | 7/2014 | da Oliveira et al. |
| 2014/0277905 | A1 | 9/2014 | Anderson |
| 2015/0046043 | A1 | 2/2015 | Bollin |
| 2015/0052786 | A1 | 2/2015 | Russell |
| 2015/0058641 | A1 | 2/2015 | Parikh |
| 2015/0064668 | A1 | 3/2015 | Manci et al. |
| 2015/0088386 | A1 | 3/2015 | Neu |
| 2015/0112546 | A1 | 4/2015 | Ochsendorf |
| 2015/0178661 | A1 | 6/2015 | Keaveny et al. |
| 2015/0199360 | A1 | 7/2015 | Pfeiffer et al. |
| 2015/0199630 | A1 | 7/2015 | Pfeiffer |
| 2015/0199637 | A1 * | 7/2015 | Pfeiffer ............ G06Q 10/06393 |
| | | | 705/7.39 |
| 2015/0199775 | A1 | 7/2015 | Pfeiffer et al. |
| 2015/0233076 | A1 | 8/2015 | Montgomery |
| 2015/0293507 | A1 * | 10/2015 | Burns .................. A01D 41/127 |
| | | | 700/83 |
| 2015/0365124 | A1 | 12/2015 | Choi et al. |
| 2015/0366124 | A1 | 12/2015 | Kremmer |
| 2016/0059412 | A1 | 3/2016 | Oleynik |
| 2016/0078391 | A1 | 3/2016 | Pfeiffer |
| 2016/0088793 | A1 | 3/2016 | Bischoff |
| 2016/0098637 | A1 | 4/2016 | Hodel et al. |
| 2016/0202227 | A1 | 7/2016 | Mathur et al. |
| 2016/0212969 | A1 | 7/2016 | Ouchida et al. |
| 2017/0090741 | A1 | 3/2017 | Tentinger |
| 2017/0168501 | A1 | 6/2017 | Ogura |
| 2017/0235471 | A1 * | 8/2017 | Schøler .................. G01F 1/666 |
| | | | 715/772 |
| 2017/0261978 | A1 | 9/2017 | Gresch |
| 2017/0322550 | A1 | 11/2017 | Yokoyama |
| 2018/0196438 | A1 | 7/2018 | Newlin |
| 2018/0359917 | A1 | 12/2018 | Pfeiffer |
| 2018/0359918 | A1 | 12/2018 | Blank et al. |
| 2018/0359919 | A1 | 12/2018 | Blank et al. |
| 2018/0364652 | A1 | 12/2018 | Blank |
| 2018/0364698 | A1 | 12/2018 | Blank |
| 2019/0146426 | A1 | 5/2019 | Blank |
| 2019/0354081 | A1 | 11/2019 | Blank |

FOREIGN PATENT DOCUMENTS

| | | |
|---|---|---|
| EP | 1111550 A1 | 6/2001 |
| EP | 1277388 A1 | 1/2003 |
| EP | 1714822 A2 | 10/2006 |
| EP | 1371278 B1 | 11/2008 |
| EP | 2916227 A1 | 9/2015 |
| EP | 2957969 A1 | 12/2015 |
| EP | 3093397 A1 | 11/2016 |
| EP | 3346347 A1 | 11/2018 |
| WO | 2013096716 A1 | 6/2013 |
| WO | 2013096721 A1 | 6/2013 |
| WO | 2015108633 A1 | 7/2015 |

(56) References Cited

FOREIGN PATENT DOCUMENTS

| WO | 2015153809 A1 | 10/2015 |
|---|---|---|
| WO | 2016115496 A1 | 7/2016 |
| WO | 2016115499 A1 | 7/2016 |
| WO | 2016116499 A1 | 7/2016 |
| WO | 2016153809 A1 | 9/2016 |
| WO | 2016200699 A1 | 12/2016 |
| WO | 2018115499 A1 | 6/2018 |

OTHER PUBLICATIONS

U.S. Final Office Action dated Sep. 3, 2021 for U.S. Appl. No. 15/983,456, 30 pages.
U.S. Non-Final Office Action dated Mar. 8, 2021 for U.S. Appl. No. 15/983,456, 32 pages.
U.S. Appl. No. 15/983,456 Office Action dated Nov. 13, 2019, 16 pages.
U.S. Appl. No. 15/626,934 Office Action dated Mar. 30, 2021, 28 pages.
European Search Repod issued in counterpad European Patent Application No. 19173588.5 dated Oct. 7, 2019 (5 pages).
Application and Drawings for U.S. Appl. No. 15/626,972, filed Jun. 19, 2017, 65 pages.
Non-Final Office Action for U.S. Appl. No. 15/983,456 dated Nov. 13, 2019, 17 pages.
Non-Final Office Action for U.S. Appl. No. 14/445,699 dated Jul. 20, 2018, 71 pages.
Restriction Requirement for U.S. Appl. No. 14/155,023 dated Mar. 30, 2016, 7 pages.
Notice of Allowance for U.S. Appl. No. 14/271,077 dated Jun. 19, 2019, 8 pages.
Prosecution History for U.S. Appl. No. 14/546,725 including: Notice of Allowance dated Apr. 2, 2019 and Advisory Action dated Jan. 22, 2019, 11 pages.
Prosecution History for U.S. Appl. No. 14/925,237 including: Corrected Notice of Allowance dated Sep. 17, 2019, Corrected Notice of Allowance dated Sep. 6, 2019, and Notice of Allowance dated Jul. 30, 2019, 18 pages.
Final Office Action for U.S. Appl. No. 15/626,934 dated Jul. 11, 2016, 22 pages.
Notice of Allowance for U.S. Appl. No. 15/626,967 dated Jul. 17, 2019, 7 pages.
Notice of Allowance for U.S. Appl. No. 15/629,260 dated Apr. 9, 2019. 10 pages.
First Office Action for Chinese Patent Application No. 201480068108.2 dated Oct. 8, 2018, 12 pages.
Search Report for German Patent Application No. 102018209843.3 dated Apr. 9, 2020, 12 pages.
Combine Harvester Instrumentation System for Use in Precision Agriculture, Yap Kin, 2011, 21 pages.
U.S. Appl. No. 14/271,077 Prosecution History through Oct. 10. 2017, 122 pages.
U.S. Appl. No. 14/546,725 Prosecution History dated Jan. 23, 2019, 304 pages.
U.S. Appl. No. 15/980,234 Prosecution History dated Jan. 24, 2019, 219 pages.
U.S. Appl. No. 16/246,818 Application and Drawings filed Jan. 14, 2019, 62 pages.
U.S. Appl. No. 15/983,456 Application and Drawings filed May 18, 2018 and Preliminary Amendment filed Jul. 13, 2018, 198 pages.
U.S. Appl. No. 14/925,237 Prosecution History dated Feb. 19, 2019, 232 pages.
U.S. Appl. No. 15/626,972 Prosecution History as of Feb. 19, 2019, 65 pages.
U.S. Appl. No. 15/626,967 Prosecution History dated Feb. 15, 2019, 162 pages.
U.S. Appl. No. 14/445,699 Prosecution History dated Jan. 16, 2019, 350 pages.
U.S. Appl. No. 15/629,260 Prosecution History dated Mar. 13, 2019, 157 pages.
U.S. Appl. No. 15/626,934 Prosecution History dated Feb. 15, 2019, 88 pages.
European Patent Application No. 18176691.6-1217 Extended European Search Report dated Oct. 25, 2018, 8 pages.
Chinese Patent Application No. 20140068108.2 1st Office Action dated Oct. 8, 2018, 12 pages. (Chinese Only).
International Search Report and Written Opinion for International Application No. PCT/US2014/069541, dated Apr. 15, 2015, date of filing: Dec. 10, 2014, 17 pages.
European Search Report Application No. 14879223.7 dated May 22, 2017, 7 pages.
Electronic Fleet Management for Work Truck Fleets, Jun. 20, 2013 2 pages. www.zonarsystems.com.
2013 Buyer's Guide: Fleet Automation Software, http://www.teletrac.com/assets/TT_BuyersGuide_2013.pdf, 10 pages.
Fleet Management: How it works. 2014 Verizon. 3 pages.
U.S. Appl. No. 14/445,699 Final Office Action dated Mar. 6, 2019, 66 pages.
Extended European Search Report Application No. 18176687.4 dated Nov. 6, 2018, 6 pages.
U.S. Appl. No. 15/626,934 Final Office Action dated Nov. 5, 2020, 27 pages.
U.S. Appl. No. 15/626,934 Final Office Action dated Jul. 11, 2019, 34 pages.
U.S. Final Office Action U.S. Appl. No. 19/626,934 dated Sep. 21, 2021, 33 pages.
U.S. Appl. No. 14/271,077 Notice of Allowance dated Jun. 19, 2019, 7 pages.
U.S. Appl. No. 15/626,972 Final Office Action dated Oct. 31, 2019, 9 pages.
EP Application No. 14879223.7 Communication pursuant to Article 94(3) dated May 22, 2019, 6 pages.
U.S. Appl. No. 15/980,234, Office Action dated Nov. 5, 2019, 11 pages.
U.S. Appl. No. 15/626,967 Notice of Allowance dated Jan. 3, 2019, 6 pages.
U.S. Appl. No. 15/626,972 Office Action dated Apr. 19, 2019, 14 pages.
U.S. Appl. No. 15/626,967 Notice of Allowance dated Jun. 5, 2019, 14 pages.
Final Office Action for U.S. Appl. No. 15/983,456 dated May 29, 2020, 21 pages.
Notice of Allowance for U.S. Appl. No. 15/980,234 dated May 28, 2020, 5 pages.
Non-Final Office Action for U.S. Appl. No. 15/626,834 dated Jun. 12, 2020, 25 pages.
U.S. Appl. No. 15/626,934 Office Action dated Jan. 6, 2022, 33 pages.
Brazilian Office Action issued in Brazilian Patent Application No. BR102018008598-0, dated May 11, 2022, 4 pages.
U.S. Appl. No. 15/626,934 Office Action dated Jun. 29, 2022, 34 pages.
U.S. Appl. No. 15/983,456 Office Action dated Jun. 13, 2022, 35 pages.
U.S. Appl. No. 14/271,077 Non Final Office Action dated Oct. 2, 2018, 19 pages.
U.S. Appl. No. 14/271,077 Notice of Allowance dated Feb. 14, 2019, 20 pages.
U.S. Appl. No. 15/983,456 Notice of Allowance dated Oct. 4, 2022, 14 pages.
U.S. Appl. No. 15/626,972 Non Final Office Action dated Apr. 19, 2019, 47 pages.
U.S. Appl. No. 15/626,972 Notice of Allowance dated Jun. 4, 2020, 7 pages.
U.S. Appl. No. 14/155,023 Application and Drawings file on Jan. 14, 2014, 52 pages.
U.S. Appl. No. 14/155,023 Non Final Office Action dated Jul. 20, 2016, 34 pages.
U.S. Appl. No. 14/155,023 Final Office Action dated Mar. 7, 2017, 40 pages.
U.S. Appl. No. 14/155,023 Notice of Allowance dated Nov. 13, 2017, 29 pages.

(56) References Cited

OTHER PUBLICATIONS

U.S. Appl. No. 15/626,934 Non Final Office Action dated Nov. 14, 2022, 39 pages.
Brazilian Office Action issued in Brazilian Patent Application No. BR102018012318-1, dated May 25, 2022, 4 pages.
U.S. Appl. No. 15/626,934 Final Office Action dated Mar. 23, 2023; 33 pages.
U.S. Appl. No. 14/271,077 Final Office Action dated Jan. 25, 2018, 25 pages.

* cited by examiner

SELF-LEARNING CONTROL SYSTEM FOR A MOBILE MACHINE

CROSS-REFERENCE TO RELATED APPLICATION

The present application is a continuation-in-part of and claims priority of U.S. patent application Ser. No. 15/983,456, filed May 18, 2018 which is also a continuation-in-part of and claims priority of U.S. patent application Ser. No. 15/626,967, filed Jun. 19, 2017, the content of which is hereby incorporated by reference in their entirety.

FIELD OF THE DESCRIPTION

The present description relates to a control system for a mobile machine. More specifically, the present description relates to a self-learning control system for a mobile machine.

BACKGROUND

There are a wide variety of different types of equipment, such as construction equipment, turf management equipment, forestry equipment, and agricultural equipment. These types of equipment are operated by an operator. For instance, a combine harvester (or combine) is operated by an operator, and it has many different mechanisms that are controlled by the operator in performing a harvesting operation. The combine may have multiple different mechanical, electrical, hydraulic, pneumatic, electromechanical (and other) subsystems, some or all of which can be controlled, at least to some extent, by the operator. The systems may need the operator to make a manual adjustment outside the operator's compartment or to set a wide variety of different settings and provide various control inputs in order to control the combine. Some inputs not only include controlling the combine direction and speed, but also threshing clearance and sieve and chaffer settings, rotor and fan speed settings, and a wide variety of other settings and control inputs.

Because of the complex nature of the combine operation (and other equipment) and/or the operations being performed, it can be very difficult to know how a particular operator or machine is performing in a given harvesting operation, and how to control the machine to improve performance. While some systems are currently available that sense some operational and other characteristics, and make them available to reviewing personnel, those current systems are normally informational in nature.

The discussion above is merely provided for general background information and is not intended to be used as an aid in determining the scope of the claimed subject matter.

SUMMARY

Machine data is obtained indicating a number of times that a control rule is triggered on a mobile machine, along with an indication as to whether the control operation corresponding to the control rule was implemented and a performance result of that implementation. Effectiveness analyzer logic identifies an effectiveness of the control rule and machine learning logic generates a rating for the rule, based on its effectiveness. A rule modification engine is automatically controlled to make any control rule modifications, and a synchronization engine updates the modified control rules with control rules on the mobile machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
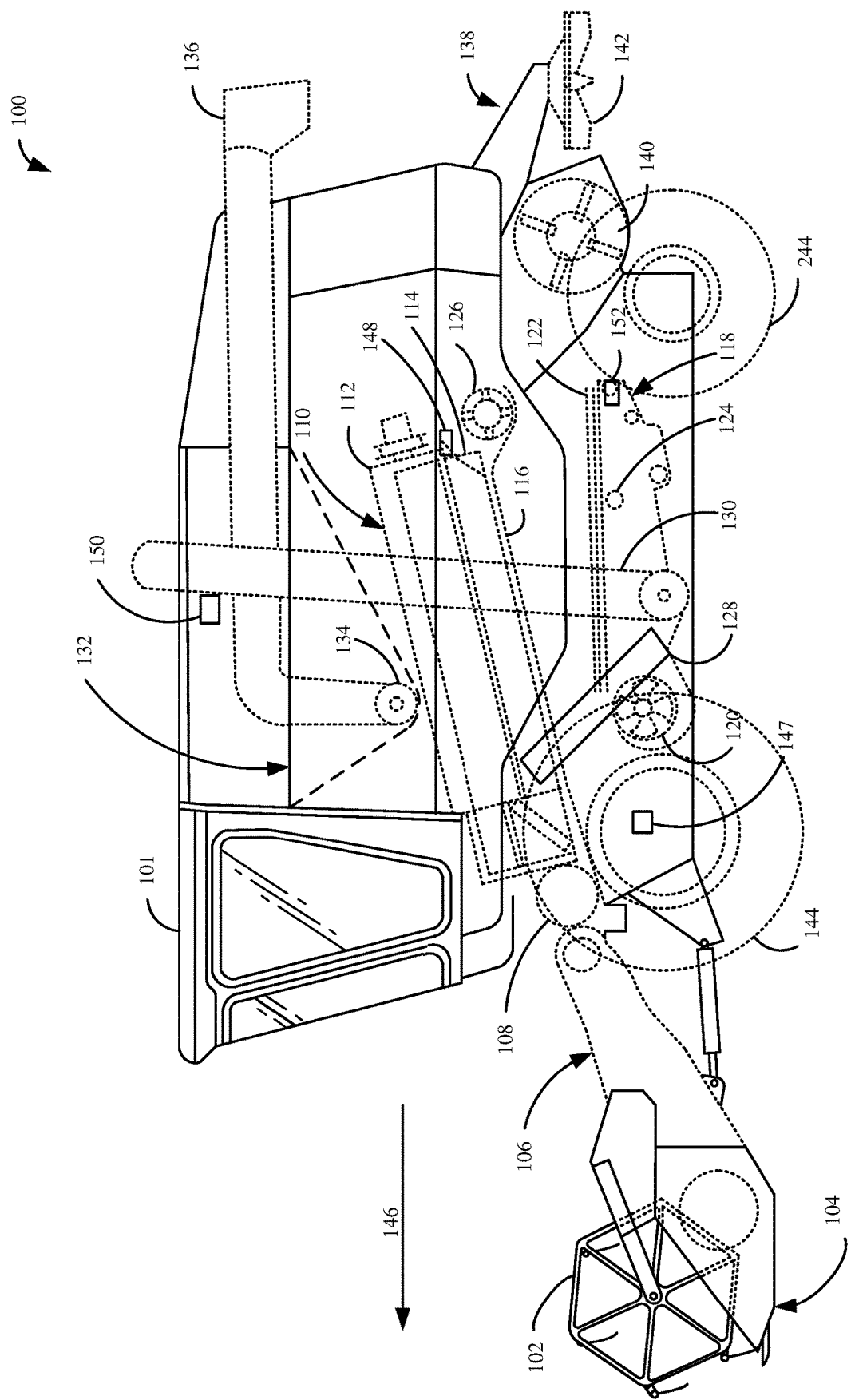
FIG. 1 is a partial pictorial, partial schematic illustration of a combine harvester.

The present description applies to mobile machines such as agricultural mobile machines, construction machines, forestry machines, turf management machines, etc. It will be described with respect to the mobile machine being a combine harvester, but it could just as easily be described with respect to other machines. The description is provided for the sake of example only.

Combine harvesters often have a wide variety of sensors that sense a variety of different variables, such as operating parameters, along with crop characteristics, and operating conditions, environmental parameters, etc. The sensors can be mounted on the harvester or elsewhere (such as on a tethered or untethered drone, etc.). The sensors can communicate this information over a controller area network (CAN) bus (or another network, such as an Ethernet network, various wireless networks, etc.) to various systems that can process the sensor signals and generate output signals (such as control signals) based on the sensed variables. Given the complex nature of the control operations needed to operate a combine harvester, and given the wide variety of different types of settings and adjustments that an operator can make, and further given the widely varying different types of crops, terrain, crop characteristics, etc. that can be encountered by a combine harvester, it can be very difficult to determine how a particular machine, or operator, is performing. It can also be difficult to perform automated control of the machine or to surface suggested control operations. This problem is exacerbated when a particular organization has a plurality of different combine harvesters that are all operating at the same time. These combine harvesters are often referred to as a "fleet" of harvesters.

The operation of the fleet of harvesters is often overseen by a (remote or local) fleet manager (or farm manager) who is located remotely relative to at least some of the combine harvesters in the fleet. It can be extremely difficult for a farm manager or remote manager to determine how the various combine harvesters are operating in the fleet, how they are operating relative to one another, how they are operating relative to other similarly situated harvesters, etc. It is also extremely difficult for a remote manager to identify performance criteria for the various operators and machines, and determine how they compare relative to one another, in near real time.

Further, it can be very difficult to automatically control the machines or to even suggest control operations or setting adjustments that will improve performance. Thus, it is very difficult for a remote manager to attempt to modify the settings on any combine harvester to increase the performance of that harvester.

Instead, the remote manager often needs to review data after the harvesting season, and even then the task is difficult. The remote manager often needs to switch between different applications, between different views of data, for the different machines and operators, in an attempt to compare the data in this way. This results in a relatively large amount of bandwidth consumption, because the operator often needs to make many different calls from his or her device to a remote data store where the information is stored.

Some systems currently allow remote viewing of settings, to some extent. One drawback is the delay time involved. In current systems, there may be an undesirably long delay.

Additionally, a vehicle operator or remote manager may have a variety of different goals that they wish to prioritize/achieve, such as, decreasing grain loss, increasing productivity, increasing job quality (such as harvested grain quality), increasing fuel economy, increasing power utilization, etc. However, sometimes achieving the goals that an operator or remote manager have, is not possible, given the current crop conditions, operating conditions, environmental conditions and, machine settings, etc.

In one control system, rules are generated that map performance to control adjustments. When the performance of a machine triggers a rule, the corresponding control adjustment is surfaced for the operator. However, it can be difficult to know whether the operator took the recommended action and, if so, how it affected the performance of the machine and how quickly the affect was seen. Thus, it can be difficult to know which rules are being used, which ones are working, how well they are working, and whether certain control areas do not have adequate rule coverage.

The present description is directed to one or more systems to perform automated self-monitoring and learning so the control rules can be modified, so that new control rules can be deployed and/or ineffective control rules can be eliminated.

FIG. 1 is a partial pictorial, partial schematic, illustration of an agricultural machine 100, in an example where machine 100 is a combine harvester (or combine). It can be seen in FIG. 1 that combine 100 illustratively includes an operator compartment 101, which can have a variety of different operator interface mechanisms, for controlling combine 100, as will be discussed in more detail below. Combine 100 can include a set of front end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concave 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 146 illustratively senses the travel speed of combine 100 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation of combine 100. Crop property sensors can sense a variety of different types of crop properties, such as crop type, crop moisture, and other crop properties. They can also be configured to sense characteristics of the crop as they are being processed by combine 100. For instance, they can sense grain feed rate, as it travels through clean grain elevator 130. They can sense mass flow rate of grain through elevator 130, or provide other output signals indicative of other sensed variables. Some additional examples of the types of sensors that can be used are described below.

Figure 2:
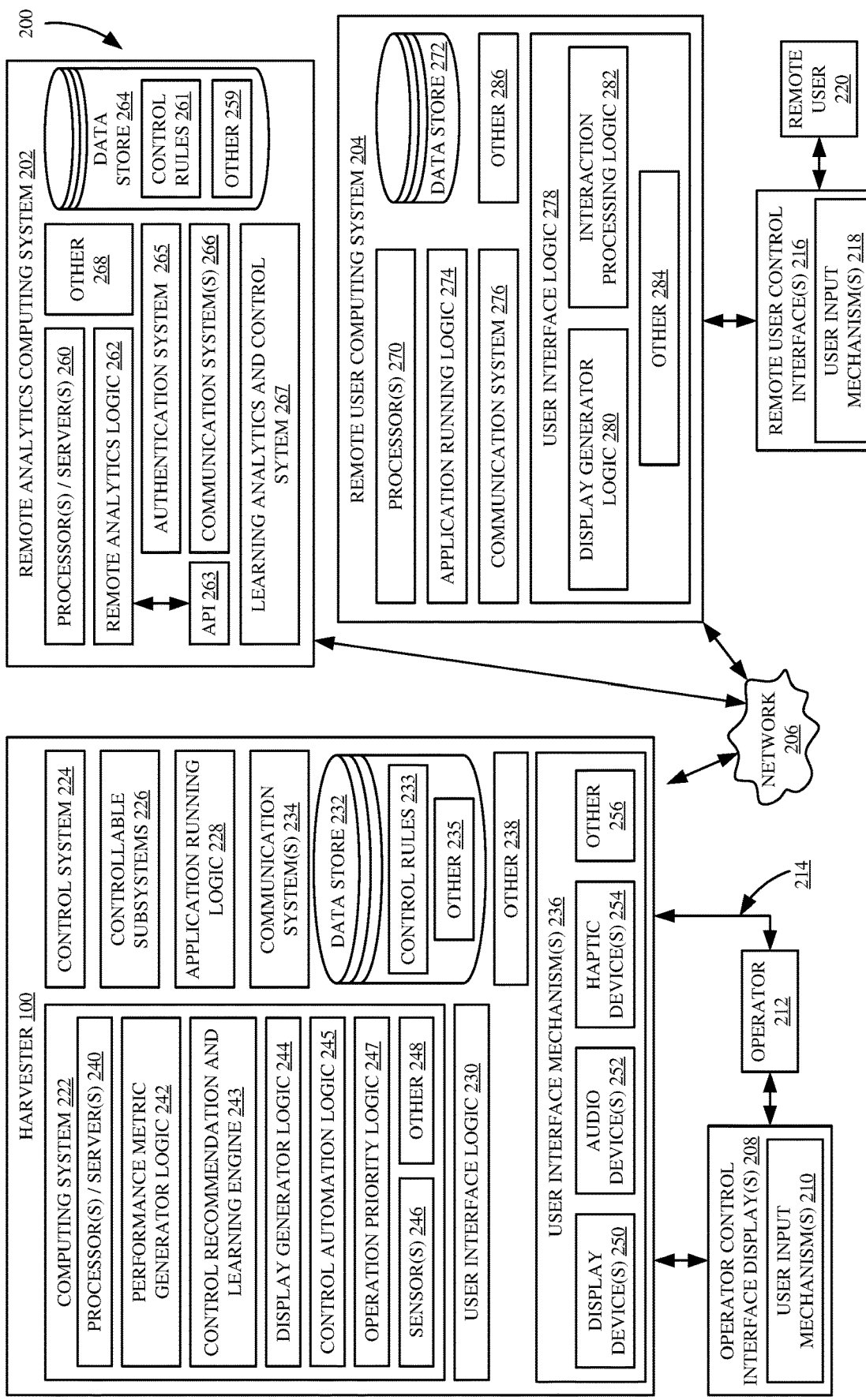
FIG. 2 is a block diagram of one example of a computing system architecture that includes the combine harvester illustrated in FIG. 1.

FIG. 2 is a block diagram showing one example of an architecture 200 that includes combine harvester 100 coupled for communication with remote analytics computing system 202 and remote manager computing 204, over network 206. While system 102 is shown remote from machine 100, it can reside on machine 100 as well (or instead) and showing it disposed remotely is just one example. Network 206 can be any of a wide variety of different types of networks, such as a wide area network, a local area network, a near field communication network, a cellular network, or any of a wide variety of other networks or combinations of networks. As is discussed in greater detail below, combine harvester 100 can communicate with other systems using store-and-forward mechanisms as well. FIG. 2 also shows that, in one example, combine harvester 100 can generate operator interface displays 208 with user input mechanisms 210 for interaction by operator 212. Operator 212 is illustratively a local operator of combine 100, in the operator's compartment of combine 100, and can interact with user input mechanisms 210 in order to control and manipulate combine harvester 100. In addition, as is described below, operator 212 can interact directly with other user interface mechanisms on combine harvester 100. This is indicated by arrow 214.

FIG. 2 also shows that, in one example, remote manager computing system 204 illustratively generates user interfaces 216, with user input mechanisms 218, for interaction by remote user 220 (who may be a farm manager, a remote manager, or other remote user that has access to data corresponding to combine 100). Remote user 220 illustratively interacts with user input mechanisms 218 in order to control and manipulate remote manager computing system 204, and, in some examples, to control portions of combine harvester 100 and/or remote analytics computing system 202.

Before describing the overall operation of architecture 200 in more detail, a brief description of some of the items in architecture 200, and their operation, will first be provided. As shown in FIG. 2, in addition to the items described above with respect to FIG. 1, combine 100 can include computing system 222, one or more control systems 224, controllable subsystems 226, application running logic 228, user interface logic 230, data store 232 (which can include control rules 233 and other items 235), one or more communication systems 234, user interface mechanisms 236, and it can include a wide variety of other items 238. Computing system 222, itself, can include one or more processors or servers 240, performance metric generator logic 242, control recommendation and learning system 243, display generator logic 244, a plurality of different sensors 246, and it can include a wide variety of other items 248. User interface mechanisms 236 can include one or more display devices 250, one or more audio devices 252, one or more haptic devices 254, and it can include other items 256, such as a touch sensitive screen, speech recognition system, steering wheel, joysticks, pedals, levers, buttons, keypads, etc.

As described above with respect to FIG. 1, sensors 246 can generate a wide variety of different sensor signals representing a wide variety of different sensed variables. Performance metric generator logic 242 (as is described in greater detail below with respect to FIG. 5) illustratively generates performance metrics indicative of the operational performance of combine 100. Control recommendation and learning engine 243 receives the performance metrics and sensor signals and evaluates control rules 233 to determine whether a control operation should be automatically performed or recommended to operator 212 to improve the performance of harvester 100. This is described in more detail below with respect to FIGS. 4A and 6. It also generates learning data that can be sent to remote analytics and control system 262.

Display generator logic 244 illustratively generates a control interface display for operator 212. The display can be an interactive display with user input mechanisms 210 for interaction by operator 212. Operation priority logic 247 (as is described in greater detail below with respect to FIG. 3) illustratively allows operator 212 to choose, with user input mechanisms 210, a priority of performance metrics relative to one another. In one example, operation priority logic 247 allows an operator 212 to choose a single performance metric as a top priority. In another example, operation priority logic 247 allows operator 212 to choose and weight multiple different performance metrics, each having different priorities relative to one another.

Control automation logic 245 can automatically change machine settings of harvester 100 based on choices made by operator 212 during their interaction with operation priority logic 247. For instance, if operator 212 chooses grain savings as the highest priority performance metric, then control recommendation and learning engine 243, along with control automation logic 245, controls actuators in controllable subsystems 226 (or other actuators) to implement machine settings that have been found to cause high grain saving metric scores. If the operator identifies an ordered set of a plurality of different performance metrics, ordered from higher to lower priority, engine 243 and logic 245 can automatically control harvester 100 based on the ordered set of performance metrics.

Control recommendation and learning engine 243 can receive control rules 233 from remote analytics computing system 202 that are generated based on machine information, machine settings, environment and conditions, crop conditions, etc. and the metric results they produced, for a number of other similarly situated machines, to determine which settings should be implemented to achieve the priorities of operator 212 or a farm manager, etc. In one example, engine 243 can receive this information and store it in local data store 232, so it can be used to identify machine settings for controlling machine 100 without needing to communicate with remote system 202, in near real time.

In another example, processing can be done by remote system 202 in near real time. For example, if operator 212 chooses grain quality as a highest priority performance metric, performance metric generator logic 242 and engine 243 can send the current performance metrics, machine information, machine settings, sensor data, environmental conditions, crop conditions, etc. to remote analytics computing system 202 to be analyzed. Remote analytics computing system 202 can receive this information and evaluate control rules to determine the highest grain quality metric achieved by a similar or same machine (or set of machines) in light of similar or same environmental, machine and crop conditions. Then remote analytics computing system 202 identifies control rules that were triggered and control operations (e.g., adjust machine settings, etc.) that will improve machine performance and sends the control operation to engine 243 and control automation logic 245. Control automation logic 245 will then automatically implement the control operation to achieve a higher grain quality metric. A similar process can be used for other metric priorities or combinations of metric priorities as well.

Control recommendation and learning engine 243 may operate at different levels of autonomy. For example, it may operate at a low level of automation such that it offers a set of machine setting alternatives (or other control operations) for operator 212 to manually select. As another example, engine 243 may operate at a higher level of automation, such that it narrows the selection of machine settings (or other control operations) down for operator 212. As another example, it may operate at a higher level of automation, such that it suggests one set of machine settings (or other recommended control operations) for operator 212. As another example, engine 243 may operate at a higher level of automation, such that it will use control automation logic 245 to control machine 100 to execute a change in machine settings (or other control operation) that it identifies, if operator 212 approves the change. As another example, engine 243 may use control automation logic 245 to operate at a higher level of automation, such that it will automatically implement new machine settings (or control operations), while giving operator 212 a given time to veto the change, before automatically implementing the settings change. As another example, engine 243 can use control automation logic 245 to operate a higher level of automation such that it controls machine 100 to automatically implement new machine settings (or control operations) and then inform operator 212. As another example, engine 243 can use control automation logic 245 to automatically change machine settings (or perform other control operations) and informs operator 212, but only if operator 212 asks to be updated. As another example, engine 243 can use control automation logic 245 to automatically implement new machine settings (or other control operation) and only inform operator 212 under certain circumstances (e.g., such as when a major change to machine settings is executed) or without specifically notifying operator 212 other than to update an interface display that shows the settings.

Control system 224 can generate control signals for controlling a variety of different controllable subsystems 226 based on the sensor signals generated by sensors 246, based on the performance metrics generated by performance score generator logic 244, based upon user inputs received through user interface mechanisms 236, based upon information received from remote manager computing system 204, based on recommended control operations output by engine 243, based on outputs from control automation logic 245 or from remote analytics computing system 202, or it can generate control signals a wide variety of other ways as well. Controllable subsystems 226 can include a variety of different systems, such as a propulsion system used to drive combine 100, a threshing subsystem as described above with respect to FIG. 1, a cleaning subsystem (such as the cleaning fan, the chaffer, the sieve, etc.) and/or a variety of other controllable subsystems, some of which are discussed above with respect to FIG. 1.

Application running logic 228 can illustratively run any of a variety of different applications that may be stored in data store 232. The applications can be used to control combine 100, to aggregate information sensed and collected by combine 100, to communicate that information to other systems, etc. Communication systems 234 illustratively include one or more communication systems that allow combine 100 to communicate with remote analytics computing system 202 and remote manager computing system 204. Thus, they include one or more communication systems, that can communicate over the networks described above.

Display generator logic 244 illustratively generates an operator display and uses user interface logic 230 to display the operator display on one of display devices 250. It will be noted that display devices 250 can include a display device that is integrated into the operator compartment of combine 100, or it can be a separate display on a separate device that may be carried by operator 212 (such as a laptop computer, a mobile device, etc.). All of these architectures are contemplated herein. User interface logic 230 illustratively identifies user interaction with those interfaces and can communicate that to other portions of the system.

In the example shown in FIG. 2, remote analytics computing system 202 illustratively includes one or more processors or servers 260, remote analytics logic 262 which exposes an application programming interface (API) 263, data store 264 (which can include control rules 261 and other items 259), authentication system 265, one or more communication systems 266, learning analytics and control system 267, and it can include a wide variety of other items 268. Remote analytics logic 262 illustratively receives the performance metrics generated by performance metric generator logic 242 in computing system 222, from a plurality of different combines, including combine 100. It can illustratively aggregate that data and compare it to reference sets of data to generate multi-machine performance metrics that are based on the performance information from a plurality of different machines. The data can be stored on data store 264, along with a wide variety of other information, such as operator information corresponding to the operators of each of the combines, machine details identifying the particular machines being used, the current machine settings for each machine that are updated by the machines, and historical data collected from the various machines. Learning analytics and control system 267 illustratively receives information from the machine 100 and other machines indicating the usage and efficiency of the control rules on those machines. It can re-rank the rules, adjust the rules, and add new rules or delete existing rules based on the analysis.

Authentication system 265 can access authentication information used to authenticate remote user 220, operator 212, and others. It can include mappings between combines and the remote users they are assigned to. It can include a wide variety of other information as well.

Remote analytics computing system 202 illustratively uses one or more of the communication systems 266 to communicate with both combine 100 (and other combines) and remote manager computing system 204.

Remote manager computing system 204 can be a wide variety of different types of systems, such as a mobile device, a laptop computer, etc. It illustratively includes one or more processors 270, data store 272, application running logic 274, communication system 276, and user interface logic 278 (which, itself, includes display generator logic 280, interaction processing logic 282, and it can include other items 284). Remote manager computing system 204 can, also include a wide variety of other items 286.

Application running logic 274 illustratively runs an application that allows remote user 220 to access comparison information that compares the performance of various combines 100 and their operators on a near real time basis (such as within five seconds of real time or within another time value of real time). It also illustratively surfaces user control interfaces 216, with user input mechanisms 218 so that remote user 220 can provide settings inputs, or other control information, and communicate it to one or more combines 100. Again, as with communication systems 234 and 266, communication system 276 allows remote manager computing system 204 to communicate with other systems over network 206. Display generator logic 282 illustratively generates a display, with various interactive display elements on control user interface 216. Interaction processing logic 282 illustratively detects user interaction with the display, from remote user 220, and performs control operations based upon those user interactions.

Figure 3:
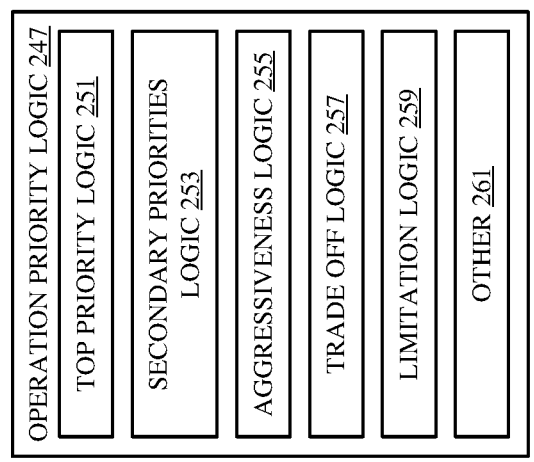
FIG. 3 is a block diagram showing one example of operation priority logic in more detail.

FIG. 3 is a block diagram showing one example of operation priority logic 247 in more detail. In the example shown in FIG. 3, operation priority logic 247 illustratively includes top priority logic 251, secondary priorities logic 253, aggressiveness logic 255, trade-off logic 257, limitation logic 259 and it can include a wide variety of other items 261.

Top priority logic 251 illustratively generates an interface with an input mechanism for operator 212 to select a performance metric as a top priority. This can be generated on a display device 250 or can be a button or other user interface mechanisms 236. For example, a list of priorities (e.g., performance metrics) can be displayed on display device 250 and the user can select one of the list items as their top priority. As another example, a variety of buttons (or other user interface mechanisms 236) are provided and each mechanism represents a performance category or metric, from which the user can select their top priority (e.g., a performance metric). Of course, a top priority can be chosen in other ways as well, such as through voice commands, etc.

Secondary priorities logic 253 illustratively generates an interface with an input mechanism for operator 212 to select secondary priorities. This interface may generate a display on device 250 or it can be a button or other user interface mechanisms 236. For example, once the top priority is selected on display device 250, the user can select one or more of the list items as their secondary priorities. Secondary priorities logic 253 can also allow operator 212 to rank multiple priorities. For example, the grain savings performance metric may be the top priority and the fuel economy performance metric and grain quality performance metric may be chosen as secondary priorities. Also, operator 212 may care more about grain quality than fuel economy. Secondary priorities logic 253 allows the operator 212 to prioritize the grain quality metric above the fuel economy metric such that machine settings and operations will be chosen to increase the grain savings metric, then the grain quality metric while also considering the fuel economy metric.

Aggressiveness logic 255 illustratively generates an interface with an input mechanism for operator 212 to select the aggressiveness with which the machine is to be controlled according to the chosen priorities. Aggressiveness can be indicative of the importance of the priorities and/or the willingness to sacrifice other metrics to achieve higher scores on the priorities. It can thus be indicative of a threshold for making a settings change. For example, a maximum aggressiveness set on a single priority will result in the machine being controlled to achieve the highest known possible metric value for that performance metric regardless of how that affects other metric values for other performance metrics (e.g., maximizing priority aggressiveness on the grain savings performance metric may maximize the grain savings metric value while substantially decreasing the productivity metric value, the fuel economy metric value and power utilization metric value). If a user lowers the aggressiveness setting then a prioritized metric value will still be prioritized, however it will be balanced against negative effects or trade-offs on other metric. For example, there may be a point where increasing the prioritized performance metric value by one percent may cost another performance metric value ten percent. Depending on the aggressiveness level, this cost-benefit may be acceptable or unacceptable and the machine is controlled accordingly.

Aggressiveness logic 255 can generate an interface on display device 250 or it can be a knob or other user interface mechanisms 236. For example, a slider may be displayed on display device 250 alongside the chosen priorities. Moving the slider changes the aggressiveness of implementing the priority settings.

Trade-off logic 257 illustratively generates an interface with an input mechanism for operator 212 to surface (by visualization) the trade-offs of prioritizing one performance metric over another. For example, choosing grain savings or grain quality metrics as a priority will affect the fuel economy metric. Trade-off logic 257 can display an indication of this trade-off in a variety of different forms such as a text message or an arrow indicating the effects of choosing a priority metric. Trade-off logic 257 can also notify operator 212 in other ways as well, such as using sound, haptic feedback, etc.

Limitation logic 259 illustratively generates an interface for operator 212 to see limitations on the different performance metrics. For example, it may be that under the current crop conditions, environmental conditions, etc., there is likely a maximum value that can be achieved for each performance metric, even if the performance metric were identified as the highest priority with the maximum aggressiveness. Therefore, in one example, limitation logic 259 identifies a maximum of some or all performance metrics and that value is displayed as a limitation on that metric. This helps put a number in context for operator 212. For example, if operator 212 is inexperienced he or she may be frustrated that the fuel economy performance metric value is "stuck" at 50/100. However, logic 259 may determine that the best performance value seen under these conditions (and hence a probable maximum performance metric value—or limitation) is 60/100. This limitation is illustratively displayed to operator 212 using limitation logic 259 and thus puts his or her performance metric value of 50/100 into context (e.g., that he or she is performing well on that performance metric, given the circumstances).

Figure 4:
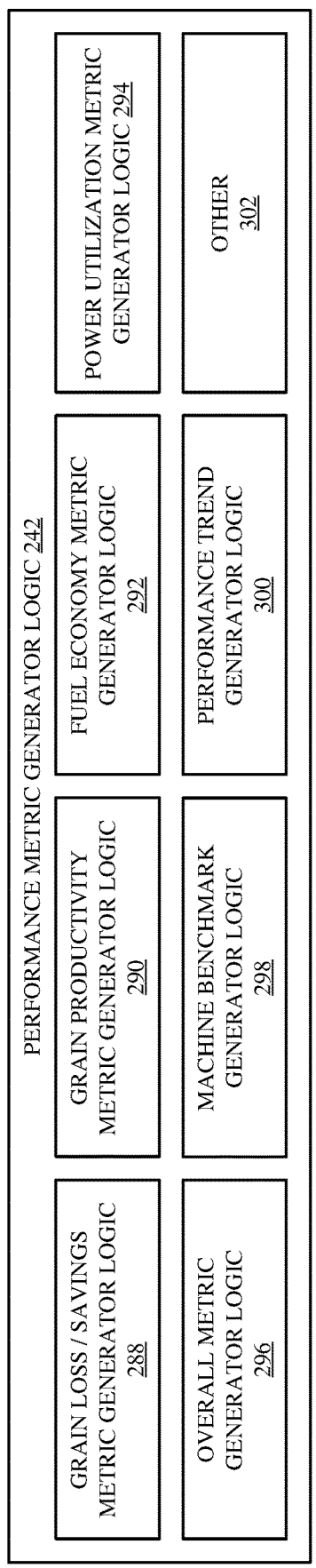
FIG. 4 is a block diagram showing one example of performance metric generator logic in more detail.

FIG. 4 is a block diagram showing one example of performance metric generator logic 242, in more detail. In the example shown in FIG. 4, performance metric generator logic 242 illustratively includes grain loss/savings metric generator logic 288, grain productivity metric generator logic 290, fuel economy metric generator logic 292, power utilization metric generator logic 294, overall metric generator logic 296, machine benchmark generator logic 298, performance trend generator logic 300, and it can include a wide variety of other items 302. Some ways of generating performance metrics are shown in more detail in co-pending US Patent Publication numbers 2015/0199637 A1 (now U.S. Pat. No. 9,892,376 B2), 2015/0199360 A1, 2015/0199630 A1, 2015/0199775 A1, 2016/0078391 A1 which are incorporated herein by reference.

Grain loss/savings metric generator logic 288 illustratively generates a metric indicative of grain savings or grain loss that the combine 100 is experiencing. This can be generated by sensing and combining items across different domains such as the mass flow of crop through combine 100 sensed by a sensor 246, tailings volume of tailings output by combine 100 using a volume sensor, crop type, the measured loss on combine 100 using various loss sensors (such as separator loss sensors, cleaning shoe loss sensors, etc.), among others. The metric can be generated by performing an evaluation of the loss using fuzzy logic components and an evaluation of the tailings, also using fuzzy logic components. Based upon these and/or other considerations, grain loss/savings metric generator logic 288 illustratively generates a grain loss/savings metric indicative of the performance of combine 100, under the operation of operator 212, with respect to grain loss/savings.

Grain productivity metric generator logic 290 illustratively uses the sensor signals generated by sensors 246 on the combine to sense data across different domains, such as vehicle speed, mass flow of grain through combine 100, and the machine configuration of combine 100 and generate an indication of crop yield and process the crop yield to evaluate it against a productivity metric. For instance, a productivity metric plotted against a yield slope provides an output indicative of grain productivity. This is only one example.

Fuel economy metric generator logic 292 illustratively generates a fuel economy metric, based upon data from different domains, such as the throughput versus fuel consumption rate sensed by sensors on the combine 100, a separator efficiency metric and also, based upon sensed fuel consumption that is sensed by a sensor 246, vehicle state, vehicle speed, etc. The fuel economy metric can be based on a combination of a harvest fuel efficiency and a non-productive fuel efficiency. These metrics may indicate, respectively, the efficiency of combine 100 during harvesting operations, and in other, non-harvesting operations (such as when idling, etc.). Again, fuzzy logic components are illustratively applied to generate a metric indicative of fuel economy, although this is only one example.

Power utilization generator logic 294 illustratively generates a power utilization metric based on data across different domains, such as sensor signals from sensors 246 (or based on derived engine power used by combine 100, that is derived from sensor signals) under the control of operator 212. The sensors may generate sensor signals indicative of engine usage, engine load, engine speed, etc. The power utilization metric may indicate whether the machine could be more efficiently run at higher or lower power levels, etc.

Overall metric generator logic 296 illustratively generates a metric that is based upon a combination of the various metrics output by logic 288-294. It illustratively provides a metric indicative of the overall operational performance of combine 100, under the operation of operator 212.

Machine benchmark generator logic 298 illustratively generates a machine benchmark metric for each of the metrics generated by items of logic 288-296. The machine benchmark metric can, for instance, reflect the operation of combine 100, under the control of operator 212, for each of the particular metrics, over a previous time period. For instance, the machine benchmark metric for grain loss/savings may be an average of the value of the grain loss/savings metric generated by logic 288 over the prior 10 hours (or over another time period). In one example, machine benchmark generator logic 298 generates such a benchmark metric for each of the categories or metrics generated by items of logic 288-296.

Performance trend generator logic 300 illustratively generates a metric indicative of the performance of machine 100, under the operation of operator 212, over a shorter period of time than is considered by machine benchmark generator logic 298. For instance, performance trend generator logic 300 illustratively generates a trend metric indicating how combine 100 has performed over the previous 30 minutes, in each of the performance categories addressed by items of logic 288-296. In one example, it saves periodically-generated values so that it can generate a trace or continuous depiction of the value of that particular metric over the previous 30 minutes (or other time period). This is described in more detail below with respect to FIGS. 8A and 13.

Figure 4A:
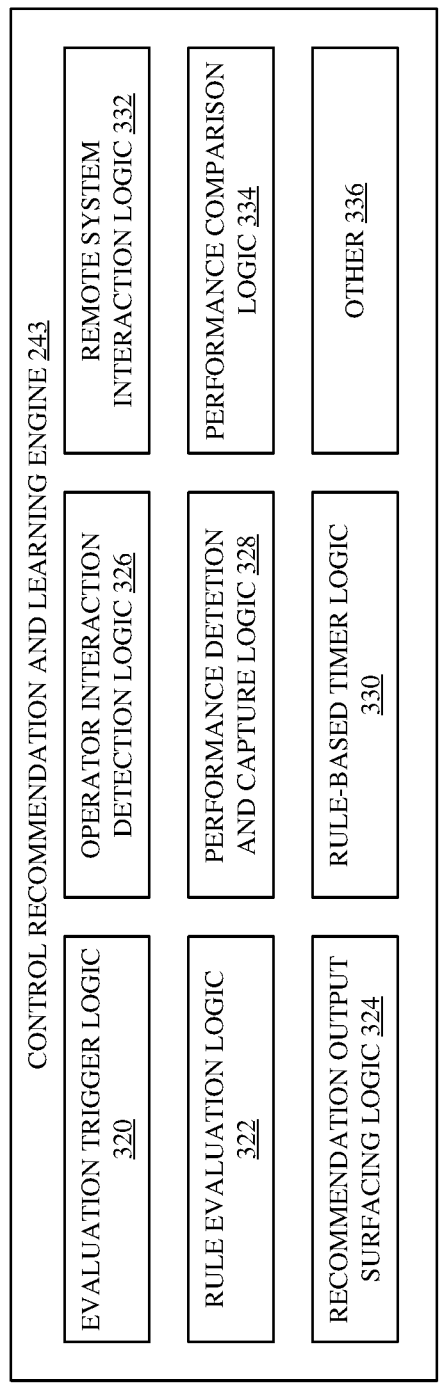
FIG. 4A is a block diagram showing one example of a control recommendation and learning engine, in more detail.

FIG. 4A is a block diagram showing one example of control recommendation and learning engine 243, in more detail. In the example shown in FIG. 4A, engine 243 illustratively includes evaluation trigger logic 320, rule evaluation logic 322, recommendation output/surfacing logic 324, operator interaction detection logic 326, performance detection and capture logic 328, rule-based timer logic 330, remote system interaction logic 332, performance comparison logic 334, and it can include a wide variety of other items 336. Evaluation trigger logic 320 detects an evaluation trigger that indicates that engine 243 is to evaluate the control rules 233, based upon the sensor data and the performance metrics from logic 242, to determine whether a control adjustment is to be performed. For instance, if a monitored variable or performance metric falls a threshold amount below a desired level, this may trigger rule evaluation. If the performance metrics or sensor data is indicating that the priorities set by the various operators and users are not being met, this may trigger rule evaluation. The rules may be evaluated on a periodic, intermittent, or other time-based criteria. The criteria can take a wide variety of other forms as well.

Rule evaluation logic 322 then evaluates the information received (e.g., the performance metrics, sensor signals, and other data) against the control rules 233. The evaluation will determine whether any of the control rules is triggered, meaning that the information against which it is evaluated fulfills the rule so that a corresponding performance operation is to be recommended or taken. For instance, if a grain loss metric is too high, this may trigger a rule which calls for the cleaning fan speed to be reduced. This is just one example.

Recommendation output/surfacing logic 324 then illustratively uses user interface logic 230 and user interface mechanisms 236 in order to surface a recommendation, identified by the triggered control rule, for the operator. For instance, it may surface a recommendation that the cleaning fan be reduced, along with an actuatable user input button which can be touched or otherwise actuated by the operator in order to implement the recommendation.

Operator interaction detection logic 326 then detects the operator interaction with the recommendation. For instance, the operator may implement the recommendation by providing a suitable user input. The operator may dismiss the recommendation by providing another user input. The operator may wait a certain amount of time before implementing or dismissing the recommendation, or the operator can interact with the surfaced recommendation in other ways as well.

Performance detection and capture logic 328 detects performance data (such as sensor data, performance metric scores, and other information) both before and after a recommendation is implemented. It may wait a particular time out period, identified by rule-based timer logic 330, between those two events. For instance, when logic 326 surfaces a recommendation for the operator, then performance detection and capture logic 328 may capture the performance data desired. Then, after operator interaction detection logic 326 detects that the operator has implemented the recommendation, rule-based timer logic 330 may identify a time out period, corresponding to the control rule (or the implemented control operation) for which processing will wait in order for the implemented control operation to take effect. By way of example, the loss sensors may not sense a change in grain loss, even though the operator has reduced the fan speed, for a certain interval of time. That interval will be identified by rule-based time logic 330 and may be a characteristic or attribute of the control rule that was triggered. Once the time out period has passed, then performance detection and capture logic 328 again captures the performance data to identify whether the performance of the machine 100 has changed, favorably or unfavorably, or has stayed the same, after implementation of the control operation. Continuing with the current example, it will capture grain loss data to indicate whether the grain loss metric has gone down, based upon the fan speed adjustment.

Remote system interaction logic 332 uses communication system 234 to communicate information to remote analytics computing system 202 (and specifically to learning analytics and control system 267) so that system 267 can automatically learn the effectiveness of the control rules and modify them accordingly. Therefore, for instance, remote system interaction logic 332 can use communication system 234 to communicate when an evaluation trigger is detected by logic 320, the result of rule evaluation by logic 322, the particular recommendation that was surfaced by logic 324, whether the operator implemented or dismissed that recommendation as indicated by logic 326, and any performance change as indicated by logic 328. In one example, remote system interaction logic 332 communicates the performance data captured before and after the control operation was implemented. In another example, performance comparison logic 334 can compare the performance data captured before the control operation was implemented with performance data captured after the control operation was implemented. The results of the comparison will illustratively indicate whether the performance of harvester 100 increased or decreased with respect to the particular performance metric (or performance metrics) under analysis, and the result of that comparison may be output by remote interaction logic 332 to remote analytics and control system 262.

Figure 5:
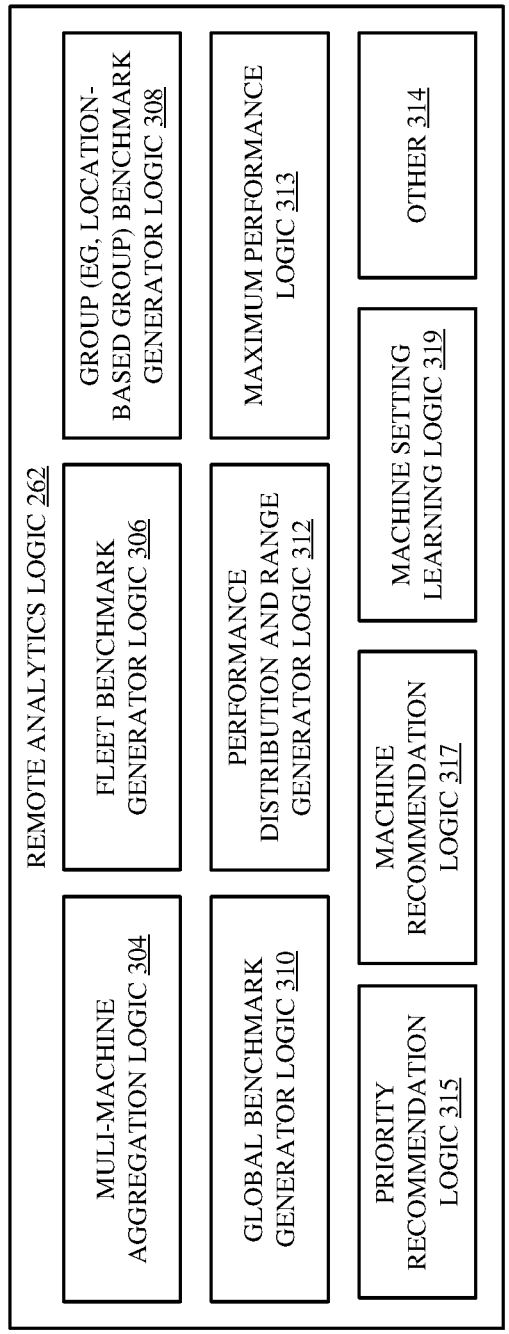
FIG. 5 is a block diagram showing one example of a remote analytics logic in more detail.

FIG. 5 is a block diagram showing one example of remote analytics logic 262 in more detail. FIG. 5 shows that, in one example, remote analytics logic 262 includes multi-machine aggregation logic 304, fleet benchmark generator logic 306, group (e.g., location-based group or other group) benchmark generator logic 308, global benchmark generator logic 310, performance distribution and range generator logic 312, and it can include a wide variety of other items 314. Multi-machine aggregation logic 304 illustratively aggregates performance information received from a plurality of different combines (including combine 100) and aggregates that information so that it can be stored or retrieved for comparison or other processing. Fleet benchmark generator logic 306 illustratively generates a fleet benchmark metric based upon the multi-machine information aggregated by logic 304. The fleet benchmark metric is illustratively indicative of the performance of a fleet of combines 100 corresponding to a particular organization that are currently harvesting the same crop as combine 100, over the last 10 hours (or other time period). Thus, in one example, fleet benchmark generator logic 306 illustratively generates an average metric indicating the average performance metric, in each of the performance categories discussed above with respect to FIG. 4, for all combines currently operating in the fleet. The average may be calculated based upon the particular performance metric values aggregated for all such combines over the last 10 hours.

Group (e.g., location-based group or other group) benchmark generator logic 308 illustratively generates a similar benchmark metric, except that the number of combines that the metric is generated over is larger than that used by fleet benchmark generator logic 306. Instead, combines from which data is obtained to generate the group benchmark metric may include data from multiple fleets or other groups.

Global benchmark generator logic 310 generates a similar set of metrics (one for each of the performance categories discussed above with respect to FIG. 4), except that the number of combines from which data is obtained to generate the metric is larger than that used by group benchmark generator logic 308. For instance, in one example, global benchmark generator logic 310 may generate a performance metric based upon the performance data obtained from all combines (which are accessible by remote analytics computing system 202) that are harvesting globally in a particular crop. The metric may be generated based on the data aggregated from those combines over the past 10 hours (or other time period).

Performance distribution and range generator logic 312 illustratively identifies a statistical distribution of observed performance values for combines 100. The statistical distribution may be generated in terms of a bell curve so that the performance values are divided into ranges corresponding to a high performance operating range, an average performance operating range and a low performance operating range. These are examples only.

Maximum performance generator logic 313 illustratively identifies maximum performance metrics based on observed performance values from combines 100. These maximum performance metrics can be divided into categories, subcategories, etc. based on the conditions that were present when the performance values were calculated. For example, maximum metrics collected in a field of a certain crop type and variety with no down crop and dry soil could be categorically differentiated from maximum metrics collected in a field with the same crop type and variety but with down crop and other soil conditions. As another example, maximum metrics collected by a large new model machine could be categorically differentiated from maximum metrics collected by an older, smaller machine. As another example, maximum metrics collected by a machine with tracks could be categorically differentiated from maximum metrics collected by the same model machine with tires instead of tracks.

Priority identification logic 315 illustratively identifies a priority setting and generates a recommendation in changing priority settings to obtain the identified goals. For example, priority recommendation logic 315 may determine that by using current priority and aggressiveness settings there is a major loss in one or more performance metrics for very little gain in a prioritized metric. In such a scenario logic 315 may also identify that switching the priority of two secondary performance metrics would make a significant improvement in overall performance. Accordingly, priority recommendation logic 315 can generate a recommendation to change the priority or aggressiveness. As another example, priority recommendation logic 315 may receive data, from a remote weather identification system, that a storm is approaching and based on the current chosen priorities, the field will not be completed before the storm arrives. However, if an operator changed the top priority to productivity and removed grain loss as a priority, then the field would be completed before the storm arrived. In these scenarios, logic 315 can surface a recommended change and, if desired, a reason for the change.

Machine control setting generator logic 317 illustratively generates recommendations on machine settings, parameters and configurations to achieve priorities selected by an operator. Machine settings and parameters can include thresher speeds, fan speeds, conveyor speeds, ground speed, sieve, chaffer and concave clearances, etc. These are examples only. Machine configurations can include, concave covers, tracks versus tires, header type, etc. These are examples only. Machine control setting generator logic 317 can determine the settings based upon settings and configurations used by machines in the past and the corresponding performance metrics that they produced.

Machine setting learning logic 319 is illustratively a machine learning component that learns from an operator that takes manual control of a machine. Machine setting learning logic 319 can detect operator introduced changes in settings and record the conditions and outcomes of these changes. This can trigger new settings adjustment rules that can become part of an operator's rule base if successful in increasing desired performance of machine 100.

Machine setting learning logic 319 can also learn from automatic machine changes as well. For example, if a settings change is implemented by control automation logic 245 and the results are negative instead of positive, then machine setting learning logic 319 learns from this and controls analytics logic 262 to consider this information in performing further processing. Of course, if the settings change had a positive effect, then machine setting learning logic 319 learns this as well. As machine setting learning logic 319 is in communication with a large number of machines, it can look for a consensus across the machines using specific rules/machine settings and change priorities based on those observations centrally.

Figure 5A:
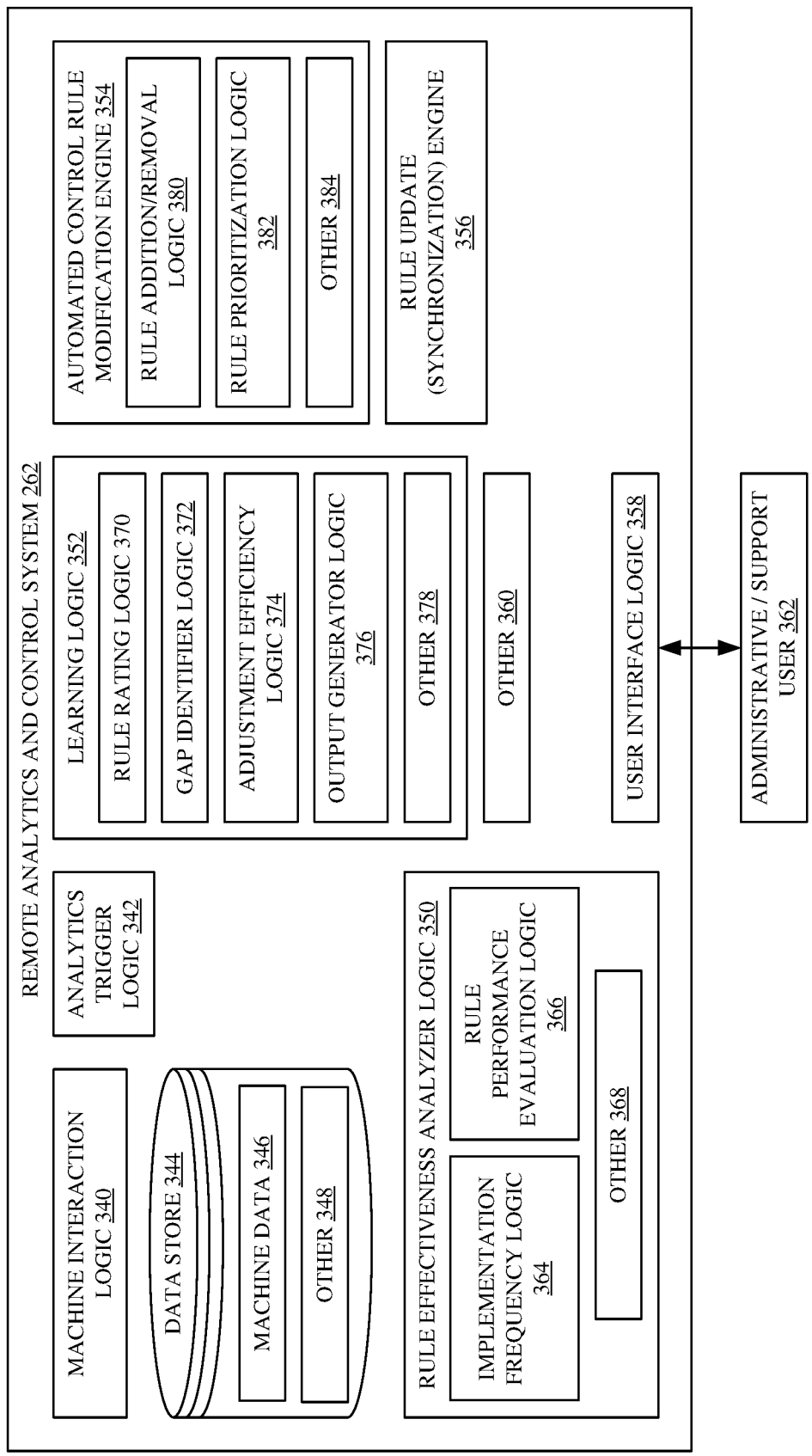
FIG. 5A is a block diagram showing one example of remote analytics and control system, in more detail.

FIG. 5A is a block diagram showing one example of remote analytics and control system 262, in more detail. System 262 illustratively includes machine interaction logic 340, analytics trigger logic 342, data store 344 (which can include machine data 346 from a plurality of different harvesters or other machines, as well as other items 348), rule effectiveness analyzer logic 350, learning logic 352, automated control rule modification engine 354, rule update (synchronization) engine 356, user interface logic 358 and it can include a wide variety of other items 360. FIG. 5A also shows that an administrative or support engineer user 362 can illustratively interact with remote analytics and control system 262 through user interface logic 358.

Briefly, in operation, machine interaction logic 340 illustratively receives the various machine data from control recommendation and learning engine 243 on harvester 100 (and it can receive it from a plurality of different harvesters as well). That information can be stored as machine data 346.

Analytics trigger logic 342 determines whether an analytics trigger has been detected indicating that it is time to perform an analytics operation to determine whether any of the control rules should be modified. Rule effectiveness analyzer logic 350 includes implementation frequency logic 364, rule performance evaluator logic 366, and it can include other items 368. Logic 350 illustratively identifies the effectiveness of the various rules that have been triggered on harvester 100 (and possibly a plurality of different harvesters). Implementation frequency logic 364 illustratively identifies how frequently a particular rule has been implemented, and how frequently it has been triggered or recommended for implementation to the operator of the harvester 100. Rule performance evaluator logic 366 evaluates the performance of the machine before and after the rule was implemented, in order to determine whether implementation of the control operation corresponding to the rule was effective in addressing the performance issue for which the rule was triggered. For example, if the performance issue that triggered the rule was that the grain loss was too high and the control operation was to decrease the cleaning fan speed, then rule performance evaluator logic 366 determines whether implementation of the control operation corresponding to the triggered rule was effective in reducing grain loss.

The information from logic 364 and 366 is illustratively output to learning logic 352 which determines whether any of the control rules need to be modified, based upon their effectiveness, or for other reasons. Thus, learning logic 352 illustratively includes rule rating logic 370, gap identifier logic 372, adjustment efficiency logic 374, output generator logic 376, and it can include other items 378. Rule rating logic 370 identifies which rules are most effective in addressing performance issues. For instance, it can identify which rules were most often implemented by operators when they were recommended, and which rules were most effective in remedying the performance issue that gave rise to the underlying control rule being triggered. It can generate a rating for the rules based upon this information. For instance, when a rule is particularly effective in remedying a performance issue, its weight may be changed so that it is triggered first, or earlier on in the operation of harvester 100, when that performance issue is detected. When a range of recommendations are provided to the operator of harvester 100, the rating may indicate which of those recommendations is provided at the top of the list, and the order of the remaining recommendations. In contrast, if the control operation corresponding to a triggered rule is often dismissed by the operator (even though it is recommended), then the rating for that rule may be decreased, or the rule may be marked for elimination as a nuisance.

Gap identifier logic 372 identifies performance issues for which no control rules exist. For instance, the performance of harvester 100 may not be favorably adjusted with the implementation of any of the rules that were recommended based upon a performance issue. In that case, gap identifier logic 372 identifies the particular performance issue, and characterizes that performance issue based upon the performance evaluation conducted by rule performance evaluator logic 366, and provides an indication that no rule was triggered and implemented which remedied or addressed the performance issue.

Adjustment efficiency logic 374 identifies an efficiency with which each triggered rule addressed the performance issue. For instance, where the performance is that grain loss is too high, and a rule triggers that has a corresponding control operation of reducing the cleaning fan speed, it may be that particular rule needed to be triggered three times, and the fan speed reduced three times by the operator, before the rule remedied the performance issue. The efficiency of the rule in remedying the performance issue can be identified in this way, and in other ways, by adjustment efficiency logic 374.

Output generator logic 376 illustratively generates a learning output from learning logic 352 that indicates the various items identified by logic 352. For instance, the output can identify a change in rule rating or weight. It can include a characterization of gaps for which no control rules exist. It can generate an output indicative of the efficiency level with which a control operation (corresponding to a triggered control rule) addresses the performance issue that triggered it, and it can include other items as well.

Automated control rule modification engine 354 automatically modifies the control rules, based upon the learning output generated by output generator logic 376. Engine 354 illustratively includes rule addition/removal logic 380, rule prioritization logic 382, and it can include a wide variety of other items 384. Rule addition/removal logic 380 illustratively generates new rules that can be added to fill the gaps identified by gap identifier logic 372. It can also generate a user experience on user interface logic 358 so that a support engineer 362 is notified of the gaps for which no rules exist, and can manually generate a new rule to address the gap. Logic 380 can also remove control rules that have been flagged for removal. For instance, if rule rating logic 370 identifies that a particular rule was triggered relatively frequently, but that its corresponding, recommended control operation was repeatedly dismissed by the operator, this may indicate that the recommendation is more of a nuisance, than a help. In that case, the rule may be severely de-weighted or removed by logic 380.

Rule prioritization logic 382 illustratively reprioritizes rules (or adjusts their trigger weights, or the weights which indicate an order in which they are presented to the operator) based upon the output from output generator logic 376. If a rule is frequently implemented, when its control operation is recommended to the operator, and if that rule is highly effective and efficient in addressing the performance issue for which the rule was triggered, then rule prioritization logic 382 will illustratively elevate the priority of that rule, so that its recommendation is presented to the operator sooner, and with a higher ranking, than the recommendations corresponding to other rules that may have a lower rating.

Rule synchronization engine 356 then intermittently synchronizes the adjusted rules down to the various harvesters 100 that are being controlled based upon those rules. The synchronization can be performed intermittently, periodically, when a synchronization trigger is reached (e.g., when a sufficient number of rules have been modified, added, deleted, etc.), or otherwise.

Figure 6A:
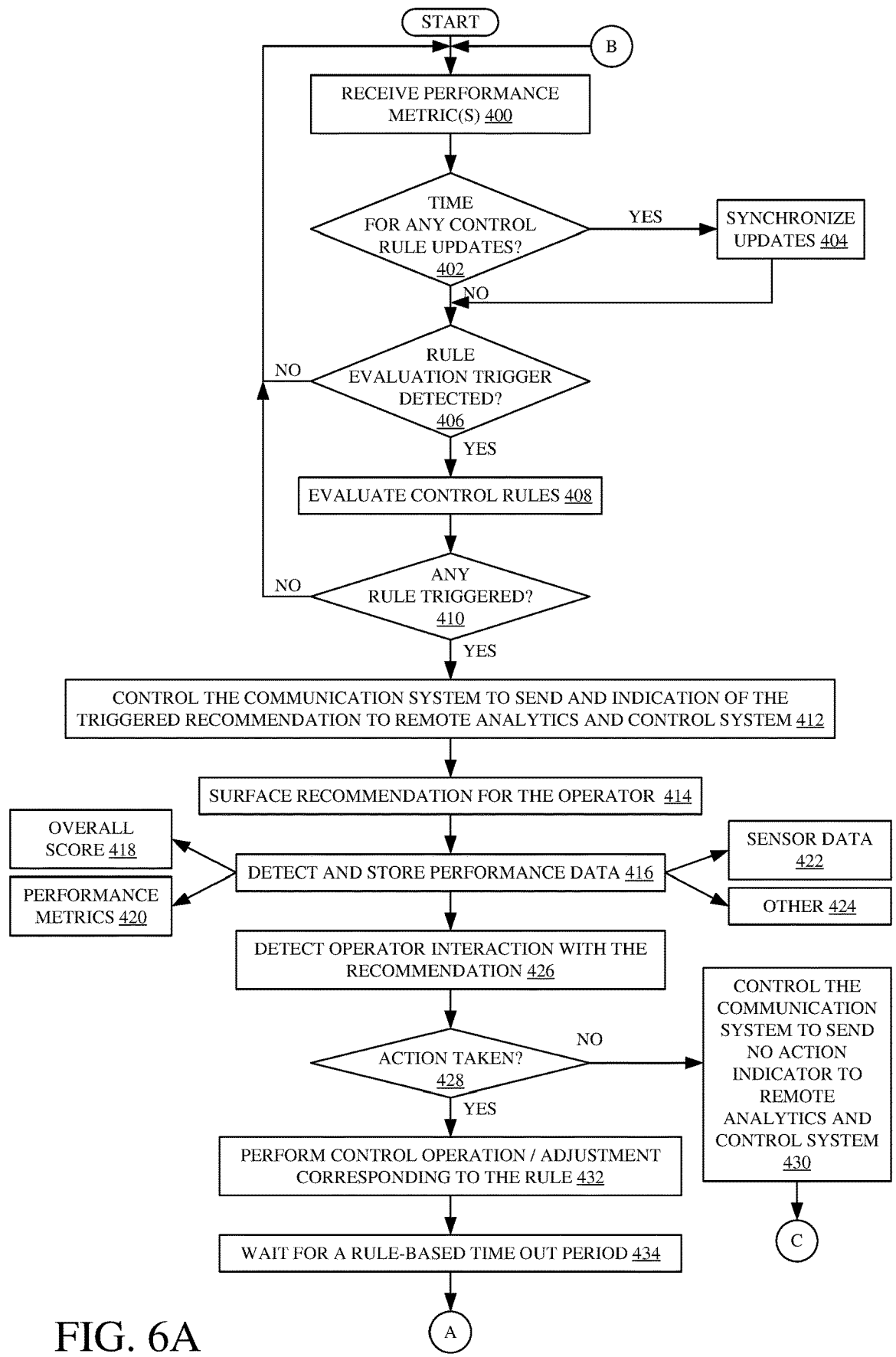
FIGS. 6A and 6B (collectively referred to herein as FIG. 6) show a flow diagram illustrating one example of the operation of the control recommendation and learning engine.
Figure 6B:
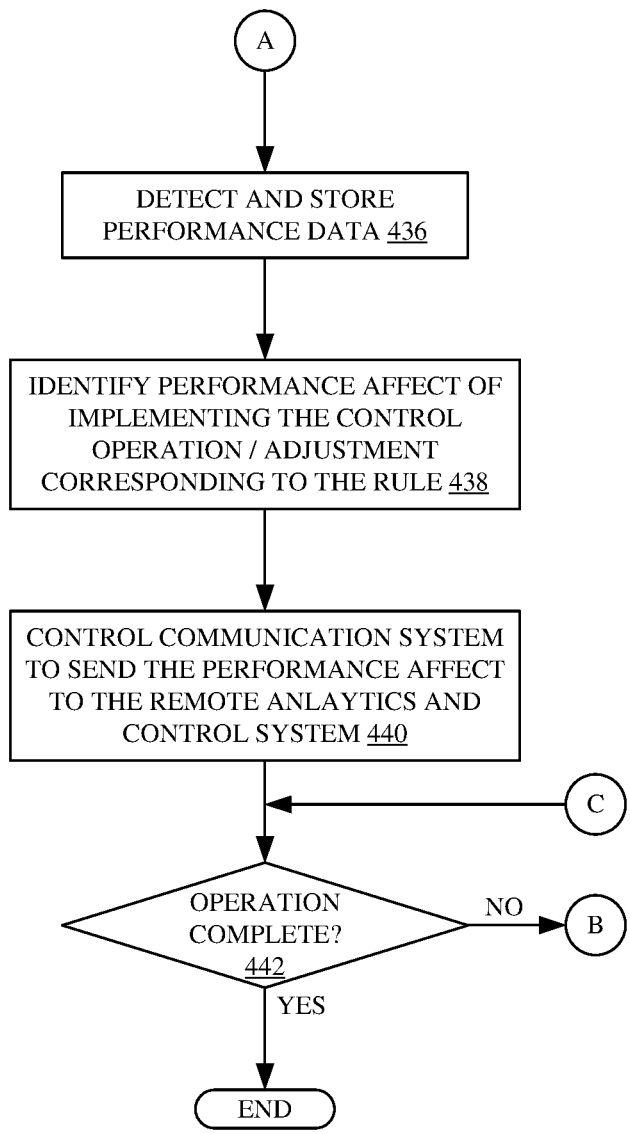

FIGS. 6A and 6B illustrate a flow diagram showing one example of the operation of the control recommendation and learning engine 243 on harvester 100 in collecting data and sending it to remote analytics and control system 262, when rules are triggered and dismissed or implemented on harvester 100. Evaluation trigger logic 320 first receives performance metrics and other information generated by performance metric generator logic 242 and determines whether it is time to synchronize rule updates from remote analytics and control system 262 to harvester 100. Receiving the performance metrics is indicated by block 400 and determining whether it is time to synchronize updates is indicated by block 402. If it is time to synchronize any rule updates of the control rules, then remote system interaction logic 332 interacts with rule synchronization engine 356 on system 262 and synchronizes the new and/or updated control rules to harvester 100. This is indicated by block 404.

Evaluation trigger logic 320 then determines whether it is time to evaluate the rules to identify whether any rules are triggered. This is indicated by block 406 in the flow diagram of FIG. 6A. A rule evaluation trigger can be a time-based trigger, a performance-based trigger (so that if a performance metric changes by a certain threshold amount an evaluation is performed), or based on a wide variety of other triggers. If not, operation proceeds to block 400 where the performance metrics are again obtained.

However, if, at block 406, evaluation trigger logic 320 determines that it is time to perform a rule evaluation, then rule evaluation logic 322 evaluates the control rules 233 against the various performance metrics and other sensor data obtained. Evaluating the control rules is indicated by block 408 in the flow diagram of FIG. 6.

If no rule is triggered, at block 410, processing again reverts to block 400. However, if, at block 410, it is determined that at least one of the control rules 233 has been triggered, then rule evaluation logic 322 controls remote system interaction logic 332 and communication system 234 to communicate the rule, and the fact that it was triggered, to system 262. This is indicated by block 412. Recommendation output/surfacing logic 324 then surfaces the recommendation corresponding to the triggered rule (or rules) to operator 212. This is indicated by block 414. Performance detection and capture logic 328 then detects and stores the performance data that is to be captured for this rule. This is indicated by block 416. For instance, the performance data may include an overall performance score for machine 100, as indicated by block 418. It may include the individual performance metrics 420. It may include a wide variety of different types of sensor data 422, and it can include other items 424.

Once the performance data is captured, operator interaction detection logic 326 detects operator interaction with the recommendation that was surfaced based upon the triggered rule. This is indicated by block 426 in the flow diagram of FIG. 6. Those interactions can take a variety of different forms. For instance, the operator can implement the recommended action. The operator can dismiss the action, or the operator can take no action. If the operator has dismissed the recommended action or if, after a certain period of time, operator interaction detection logic 326 detects that the operator has not implemented the recommended action (as indicated by block 428), then it can control remote system interaction logic 332 and communication system 234 to communicate with remote analytics and control system 262 through machine interaction logic 340 to indicate this. For instance, it can send a "no action" indicator to the remote analytics and control system 262 indicating which recommendation was surfaced, and that the operator did not implement it. This is indicated by block 430 in the flow diagram of FIG. 6.

However, if, at block 428, it is determined that the operator did indeed implement the recommended control operation, then control automation logic 245 can automatically control the controllable subsystems 226 (using control system 224 or otherwise) to perform the control operation or adjustment corresponding to the triggered rule (and corresponding to the recommendation). This is indicated by block 432. It may also be that, at block 432, the operator performs the action. The recommended operation may be, for instance, to reduce the cleaning fan speed. The operator may do this manually, and that may be detected by operator interaction detection logic 326. The control operation or adjustment can be performed in other ways as well.

Rule-based timer logic 330 then identifies a time out period corresponding to the triggered rule, and controls system 328 to wait for that time out period before it again detects and stores the performance data from harvester 100. Waiting the time out period is indicated by block 434 and detecting and storing the performance data is indicated by block 436. At this point, remote system interaction logic 332 can send both sets of performance data (the data captured before the control operation was implemented and the data captured after the time out period), or it can provide the performance data to performance comparison logic 334 which identifies the effect (in performance) of implementing the control operation or adjustment corresponding to the triggered rule. Identifying the performance effect is indicated by block 438.

Remote system interaction logic 332 then controls the communication system 234 to communicate the performance effect to the remote analytics and control system 262. This is indicated by block 440 in the flow diagram of FIG. 6. If operation of harvester 100 is not complete, then processing reverts to block 400. This is indicated by block 442.

Figure 7A:
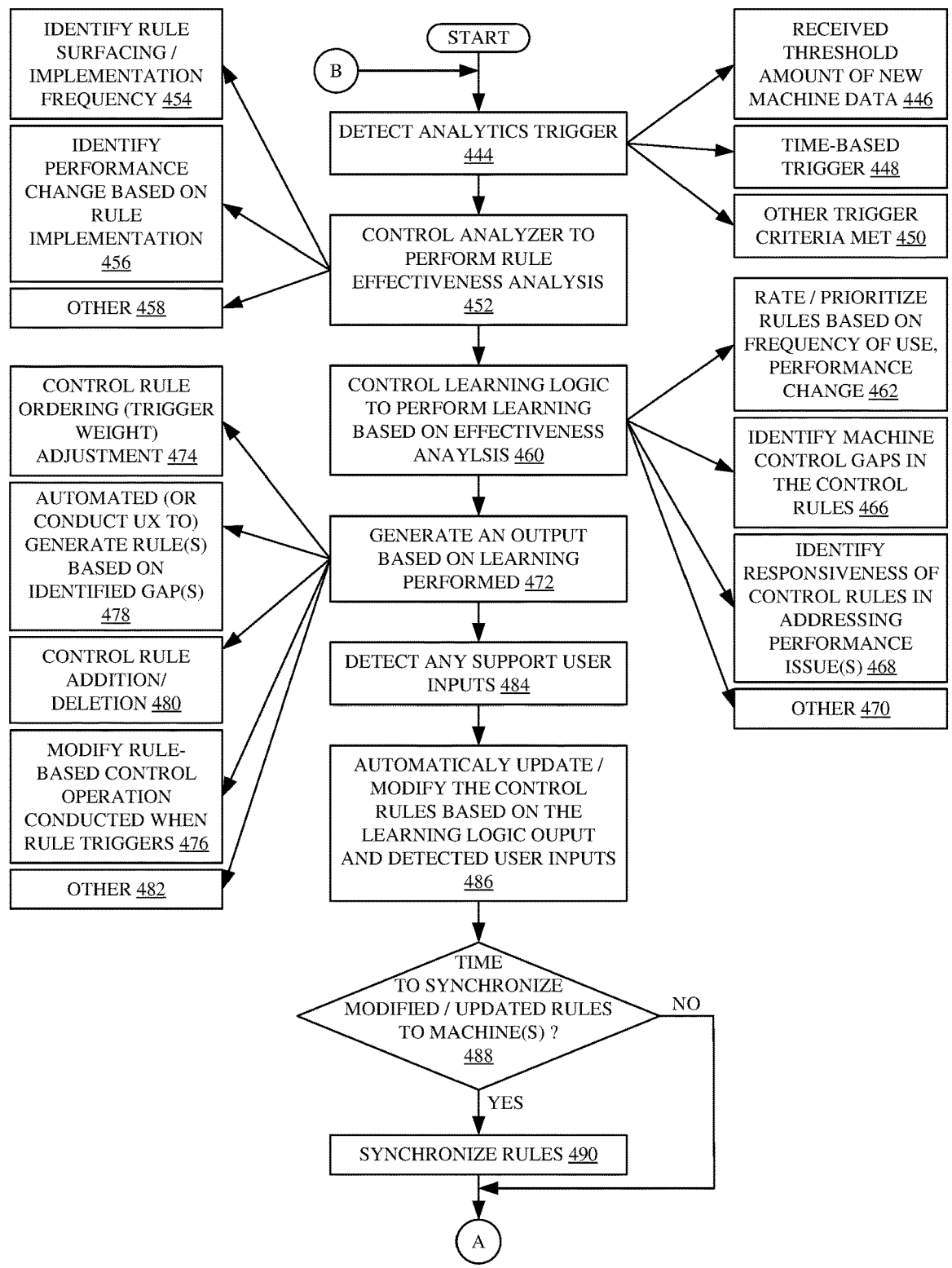
FIGS. 7A and 7B (collectively referred to herein as FIG. 7) illustrate a flow diagram showing one example of the operation of the remote analytics and control system.
Figure 7B:
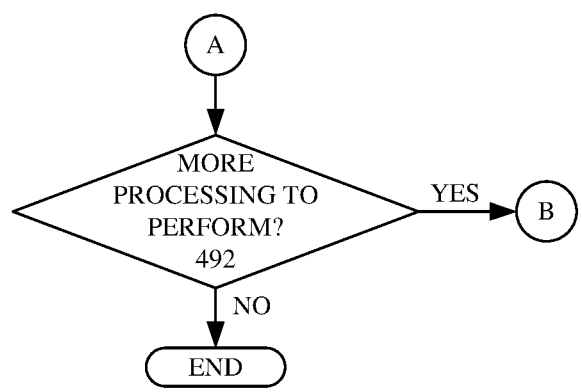

FIGS. 7A and 7B (collectively referred to herein as FIG. 7) illustrate a flow diagram showing the operation of remote analytics and control system 262, in more detail. Machine interaction logic 340 interacts with harvester 100 (and possibly other harvesters) to obtain and store machine data 344. The machine data may be data discussed above with respect to 4A, and generated by control recommendation and learning engine 243. Analytics trigger logic 342 then determines whether a trigger is detected to perform analytics and a learning operation on the received data. This is indicated by block 444 in FIG. 7. The triggers may take a wide variety of different forms. For instance, if a threshold amount of new machine data has been received, this may be detected as an analytics trigger, and this is indicated by block 446. The trigger may be a time-based trigger in which case an analytics and learning operation is performed periodically or intermittently. This is indicated by block 448. It may be a wide variety of other trigger criteria as well, and this is indicated by block 450.

Once the data analytics trigger is detected, then rule effectiveness analyzer logic 350 is controlled to perform a rule effectiveness analysis. This is indicated by block 452. For instance, implementation frequency logic 364 illustratively identifies the rule surfacing/implementation frequency as indicated by block 454. By way of example, it can identify the frequency with which a rule is triggered and its corresponding control operation is recommended to the operator. It can also identify the frequency with which the operator implements that recommended operation, dismisses it, or takes no action.

Rule performance evaluator logic 366 identifies a performance change based upon rule implementation (e.g., based upon the operator implementing the operation recommended by the rule). This is indicated by block 456. The effectiveness analysis can take a wide variety of other forms as well, and this is indicated by block 458.

System 262 then controls learning logic 352 to perform a learning operation based upon the effectiveness analysis generated by logic 350, and it can be based on other items as well. Performing the learning operation is indicated by block 460. Rule rating logic 370 can rate or prioritize the rules based upon the frequency of use, the performance change, etc. This is indicated by block 462. Gap identifier logic 372 can identify machine control gaps in the control rules. This may identify areas where performance issues arise, and where no rule was effective in addressing the performance issue. Identifying the gaps is indicated by block 464.

Adjustment efficiency logic 374 identifies responsiveness of control rules in addressing performance issues. This is indicated by block 468. The learning operation can be performed in other ways as well, and this is indicated by block 470.

Output generator logic 376 then generates an output based upon the learning operation performed. This is indicated by block 472. The output can control rule ordering (or trigger weight) adjustments. This is indicated by block 474. The output can indicate a modification to the rule-based control operation that is conducted when a rule triggers. This is indicated by block 476. For instance, if the efficiency of the rule indicates that it had to be implemented multiple times in order to address the performance issue, then the amount of adjustment corresponding to the rule may be increased each time the control operation for that rule is implemented. By way of example, if the control operation is to decrease fan speed by a certain rpm value or percentage, the control operation may be adjusted to specify decreasing fan speed by a larger rpm value or percentage. This is just one example.

The output can be provided to user interface logic 358 to conduct an automated user experience so that a support engineer user 362 can generate rules based upon the identified gaps in the control rules. This is indicated by block 478. The output can identify rules that need to be added, or deleted, as indicated by block 480. The output can take a wide variety of other forms as well, as indicated by block 482.

It may be that a support engineer user 362 provides input to the system based upon the outputs generated by user interface logic 358. In that case, those user inputs are detected by logic 358, as indicated by block 484.

Automated control rule modification engine 354 then automatically updates the control rules. For instance, it can modify the rules based upon the learning logic output generated by output generator logic 376 and based upon the detected support engineer user inputs as indicated by block 484. Automatically updating or modifying the control rules is indicated by block 486 in the flow diagram of FIG. 7.

Rule synchronization engine 356 will, at some point, determine that it is time to synchronize the updated or modified rules down to harvester 100 (and possibly other harvesters). When this occurs, it will use machine interaction logic 340 to synchronize the updated rules to the various machines. Determining whether it is time to synchronize rules is indicated by block 488 and performing a synchronization operation is indicated by block 490. In doing so, it can synchronize all of the control rules, or it can synchronize just the changes to the control rules. It can synchronize the rules in other ways as well.

When more processing is to be performed, the operation of system 262 proceeds back to block 444. This is indicated by block 492.

It can thus be seen that the system automatically learns which rules are used, and are effective and efficient. It identifies gaps in the control rules so that additional rules can be added for more comprehensive machine control. It can rearrange or modify the rules so that the most effective rules are triggered first, or so that their control operations are recommended first. This improves the operation of harvester 100, and the operation of the system in generating control rules.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that 6 displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the FIGS. show a number of blocks with functionality ascribed to each block. It will be noted that fewer blocks can be used so the functionality is performed by fewer components. Also, more blocks can be used with the functionality distributed among more components.

Figure 8:
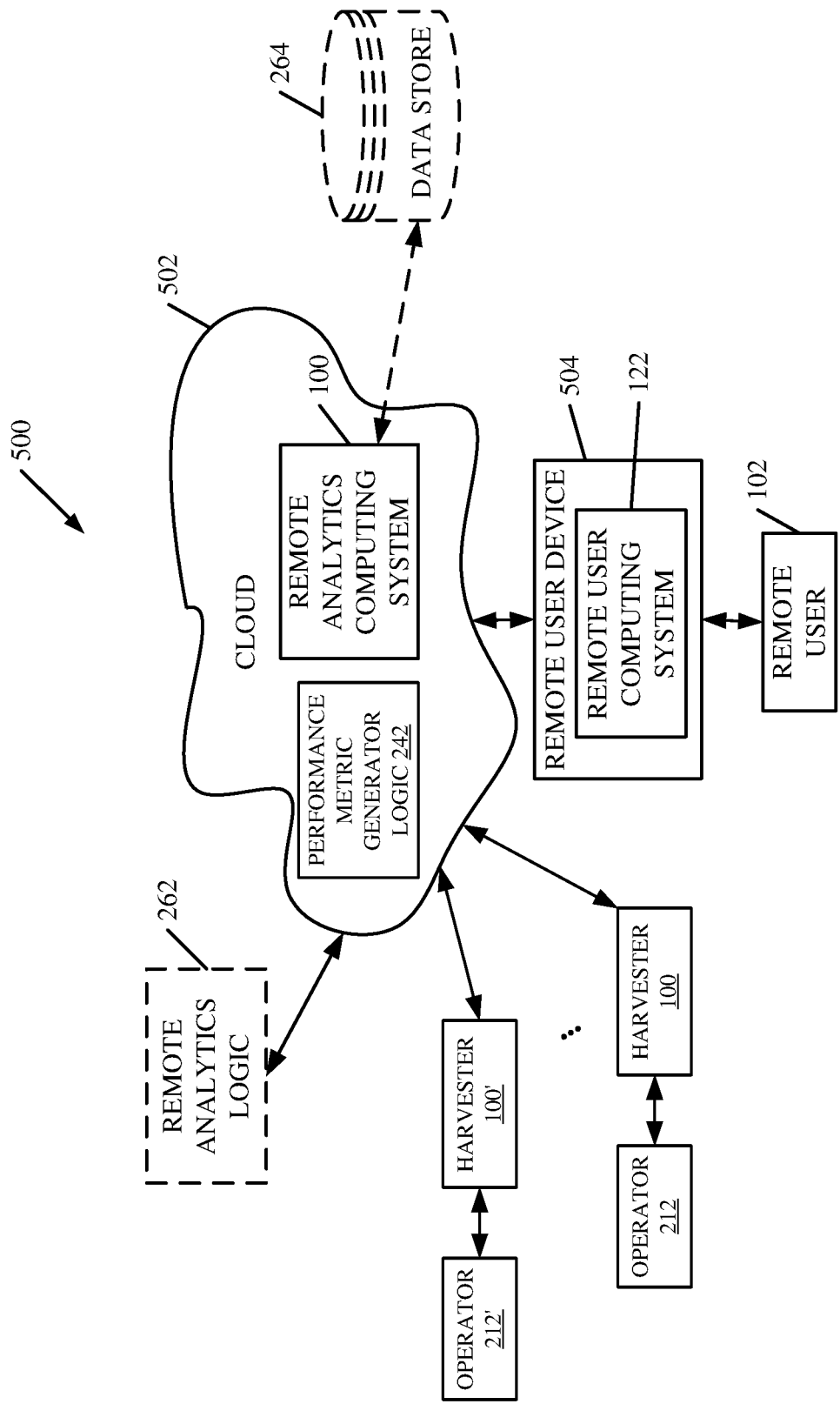
FIG. 8 shows one example of the architecture illustrated in FIG. 2, deployed in a remote server environment.

FIG. 8 is a block diagram of the architecture 200, shown in FIG. 2, except that it communicates with elements in a remote server architecture 500. In an example, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 8, some items are similar to those shown in FIG. 2 and they are similarly numbered. FIG. 8 specifically shows that the architecture can include a plurality of combines 100-100' each with its own local operator 212-212'. FIG. 8 also shows that remote analytics computing system 202 can be located at a remote server location 502. Therefore, combines 100-100' and remote user computing system 204 access those systems through remote server location 502.

FIG. 8 also depicts another example of a remote server architecture. FIG. 8 shows that it is also contemplated that some elements of FIG. 2 are disposed at remote server location 502 while others are not. By way of example, performance metric generator logic 242 can be disposed in system 202 instead of, or in addition to, being on the combines. It can communicate the performance metrics to the combines, to remote user computing system 204 or to other systems. Remote analytics logic 262 and data store 264 can be disposed at a location separate from location 502, and accessed through the remote server at location 502. Regardless of where they are located, they can be accessed directly by combine 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers.

In such an example, where cell coverage is poor or nonexistent, another mobile machine (such as a tractor and grain cart) can have an automated information collection system. As the combine comes close to the tractor and grain cart for unloading, the system automatically collects the information from the harvester using any type of ad-hoc wireless connection. The collected information can then be forwarded to another vehicle (such as a semi) or to the main network as the tractor reaches a location where there is cellular coverage (or other wireless coverage). For instance, the tractor may enter a covered location when traveling to a semi or to other machines. All of these architectures are contemplated herein. Further, the information can be stored on the combine until the combine enters a covered location. The combine, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
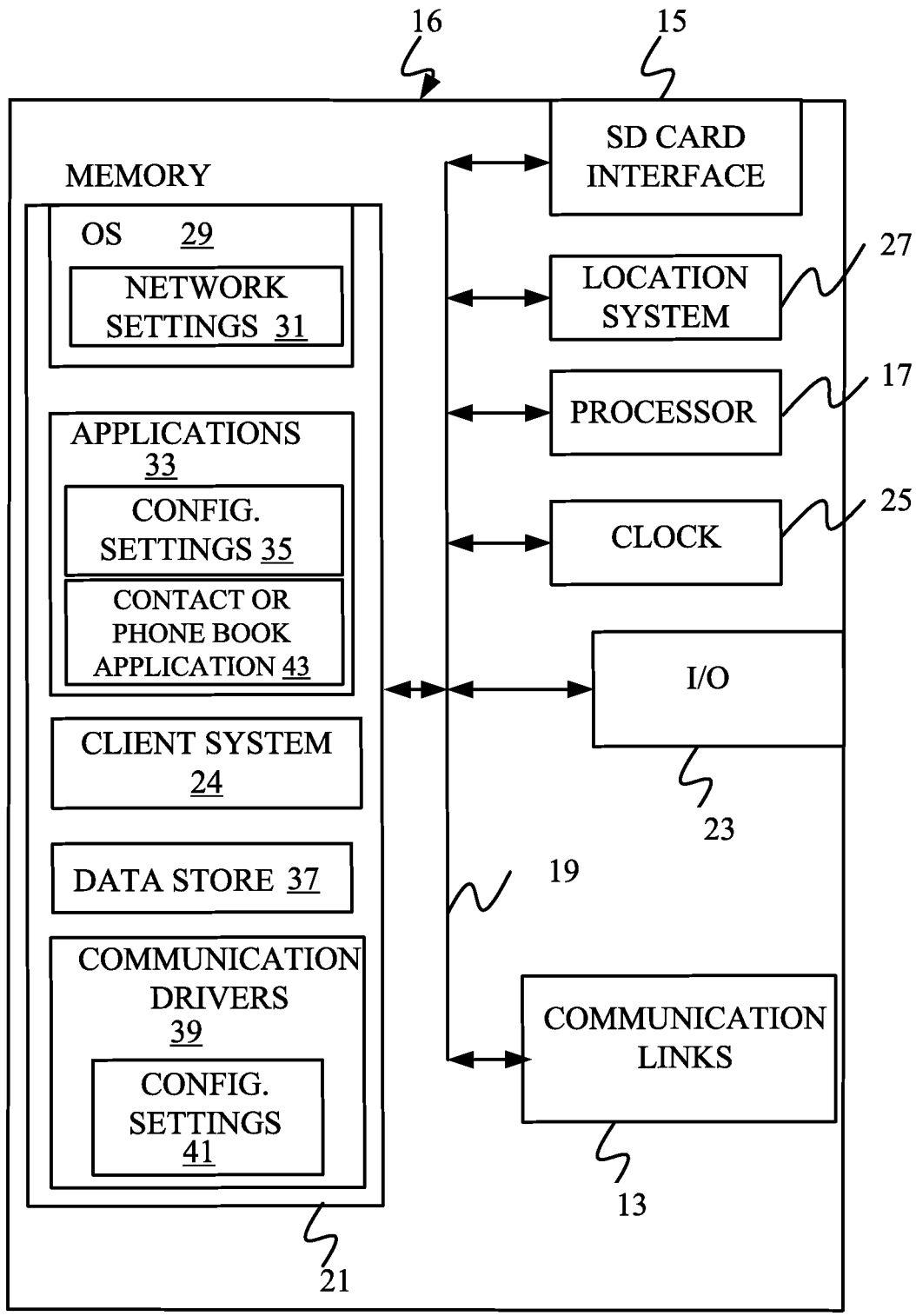
FIGS. 9-11 show examples of mobile devices that can be used in the architectures shown in the previous FIGS.
Figure 10:
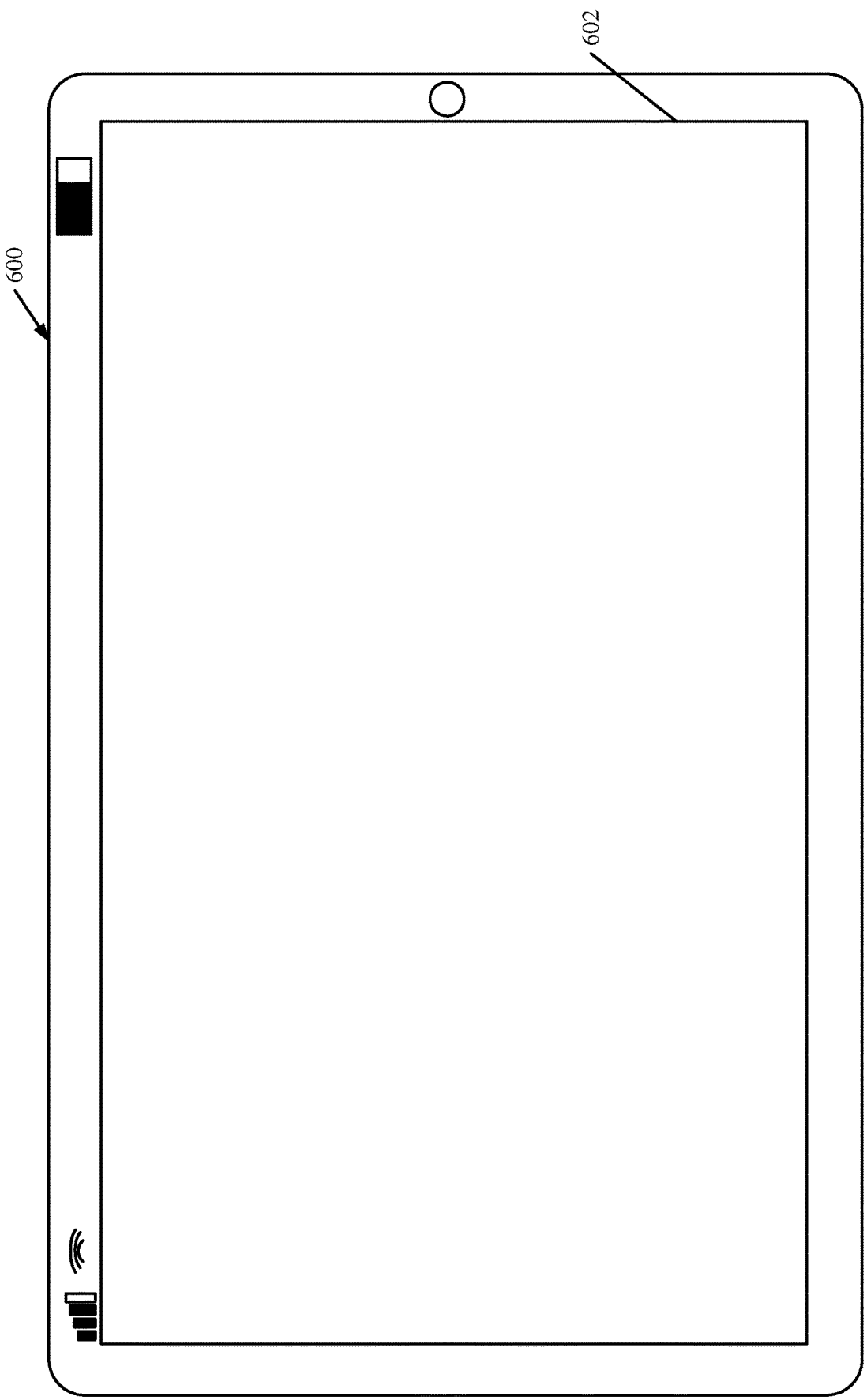
Figure 11:
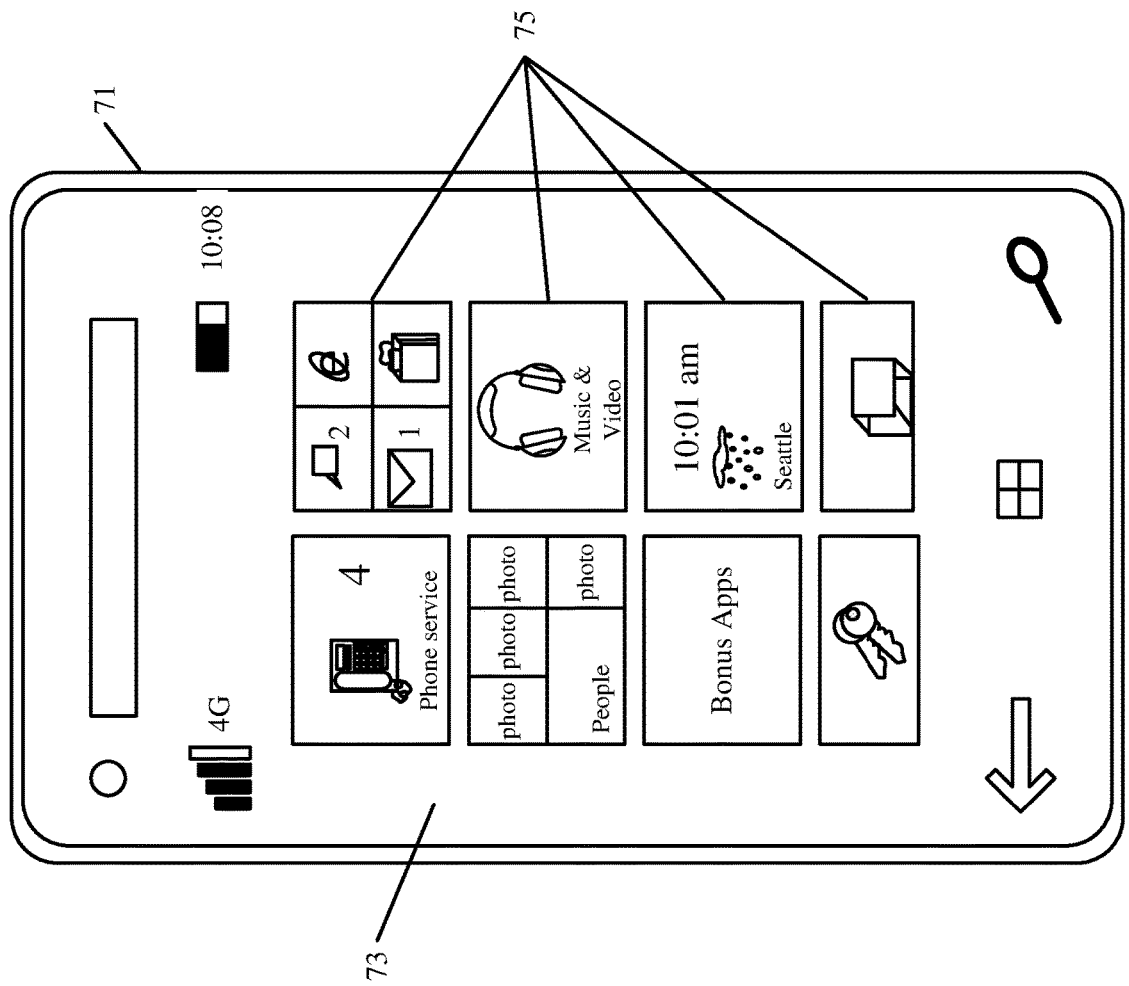

FIG. 9 is a simplified block diagram of one illustrative example of a handheld or mobile computing device that can be used as a user's or client's hand held device 16, in which the present system (or parts of it) can be deployed. For instance, a mobile device can be deployed as remote user computing system 202 in the operator compartment of combine 100 for use in generating, processing, or displaying the information discussed herein and in generating the control interface. FIGS. 10-11 are examples of handheld or mobile devices.

FIG. 9 provides a general block diagram of the components of a client device 16 that can run some components shown in FIG. 2, that interacts with them, or both. In the device 16, a communications link 13 is provided that allows the handheld device to communicate with other computing devices and in some examples provide a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 10 shows one example in which device 16 is a tablet computer 600. In FIG. 10, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
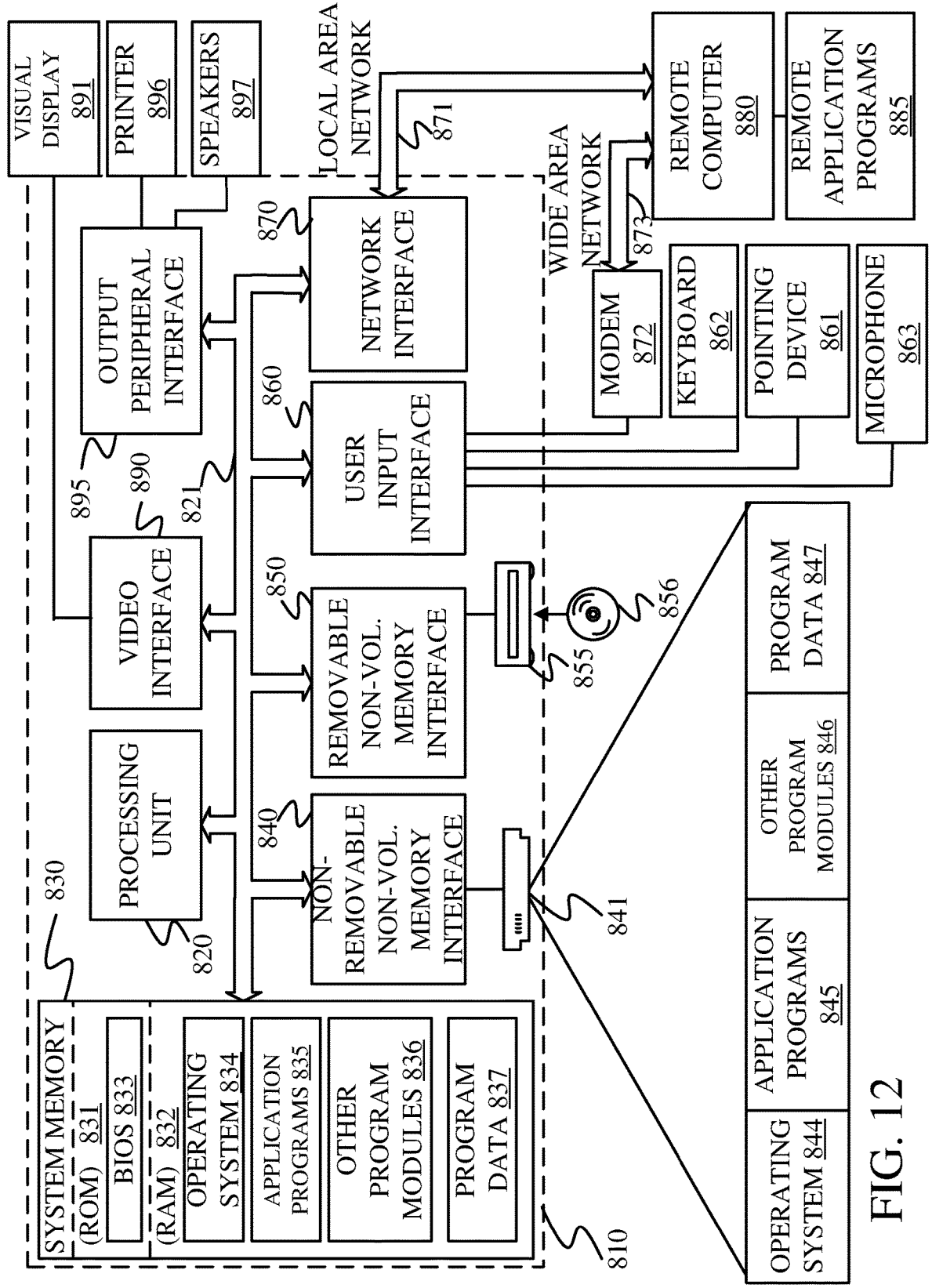
FIG. 12 is a block diagram showing one example of a computing environment that can be used in the architectures shown in the previous FIGS.

FIG. 12 is one example of a computing environment in which elements of FIG. 2, or parts of it, (for example) can be deployed. With reference to FIG. 12, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 25, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 12 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a mobile machine computing system, comprising:

machine interaction logic that receives machine data from a mobile machine, the machine data including control rule implementation data indicative of whether a control operation, corresponding to a control rule triggered on the mobile machine, was implemented by an operator of the mobile machine, and performance data indicative of an effect on machine performance of the mobile machine based on implementation of the control operation;

rule effectiveness analyzer logic that receives the machine data and generates a rule effectiveness output for the control rule based on the machine data;

learning logic that generates a rule rating output, corresponding to the control rule, indicative of a rule rating based on the effectiveness output;

an automated control rule modification engine that automatically modifies a set of control rules based on the rule rating output; and a rule update engine that automatically updates the modified set of control rules to the mobile machine.

Example 2 is the mobile machine computing system of any or all previous examples wherein the rule effectiveness analyzer logic comprises:

implementation frequency logic configured to identify, from the control rule implementation data, a frequency with which the control operation corresponding to the control rule was implemented by the operator when the control rule was triggered on the mobile machine and generate a frequency of implementation output signal.

Example 3 is the mobile machine computing system of any or all previous examples wherein the rule effectiveness analyzer logic comprises:

rule performance evaluator logic configured to receive performance data indicative of machine performance before implementation of the control operation corresponding to the triggered rule on the mobile machine and performance data indicative of machine performance after implementation of the control operation corresponding to the triggered rule on the mobile machine and generate a performance comparison output signal.

Example 4 is the mobile machine computing system of any or all previous examples wherein the rule effectiveness analyzer logic is configured to generate the rule effectiveness output based on the performance comparison output signal and the frequency of implementation output signal.

Example 5 is the mobile machine computing system of any or all previous examples wherein the automated control rule modification engine comprises:

rule prioritization logic configured to modify control rules in the set of control rules, based on the rule rating output, to change a priority with which the control rules in the set of control rules are triggered by the performance data and corresponding control operations are surfaced for the operator.

Example 6 is the mobile machine computing system of any or all previous examples wherein the automated control rule modification engine comprises:

rule removal logic configured to automatically remove the control rule, from the set of control rules, based on the rule effectiveness output.

Example 7 is the mobile machine computing system of any or all previous examples wherein the learning logic comprises:

gap identifier logic configured to identify, as a control rule gap, an area of performance improvement for the mobile machine for which no effective control rule is present in the set of control rules.

Example 8 is the mobile machine computing system of any or all previous examples and further comprising:

analytics trigger logic configured to detect an analytics trigger and generate a trigger detected output, the rule effectiveness analyzer logic generating the rule effectiveness output based on the trigger detected output.

Example 9 is a mobile machine, comprising:

a controllable subsystem;

rule evaluation logic that receives machine performance data and evaluates a set of control rules to identify any triggered control rules that are triggered based on the machine performance data;

recommendation surfacing logic that surfaces a control operation, corresponding to the triggered control rule, that controls the controllable subsystem;

operator interaction detection logic that detects whether the operator implements the control operation;

performance detection and capture logic that detects performance data before and after implementation of the recommended control operation;

a communication system; and remote system interaction logic that controls the communication system to send a performance indication indicative of the effect on machine performance that implementation of the control operation had on the machine performance and to communicate a rule identifier identifying the rule triggered and whether the operator implemented the control operation corresponding to the triggered rule, to a remote computing system.

Example 10 is the mobile machine of any or all previous examples and further comprising:

rule-based timer logic configured to identify a time-out period corresponding to the triggered rule.

Example 11 is the mobile machine of any or all previous examples wherein the performance detection and capture logic is configured to detect the performance data before implementation of the control operation, wait the time-out period after the implementation of the control operation and then detect the performance data.

Example 12 is the mobile machine of any or all previous examples and further comprising:

performance comparison logic configured to compare the performance data detected before implementation of the control operation with the performance data detected after implementation of the control operation and generate a performance comparison output, the communication system being configured to communicate the performance comparison output to the remote computing system.

Example 13 is a method of controlling a mobile machine computing system, comprising:

receiving machine data from a mobile machine, the machine data including control rule implementation data indicative of whether a control operation, corresponding to a control rule triggered on the mobile machine, was implemented by an operator of the mobile machine, and performance data indicative of an effect on machine performance of the mobile machine based on implementation of the control operation;

generating a rule effectiveness output for the control rule based on the machine data;

generating a rule rating output, corresponding to the control rule, indicative of a rule rating based on the effectiveness output;

automatically modifying a set of control rules based on the rule rating output; and automatically synchronizing the modified set of control rules to the mobile machine.

Example 14 is the method of any or all previous examples wherein generating a rule effectiveness output comprises:

identifying, from the control rule implementation data, a frequency with which the control operation corresponding to the control rule was implemented by the operator when the control rule was triggered on the mobile machine; and generating a frequency of implementation output signal.

Example 15 is the method of any or all previous examples wherein generating the rule effectiveness output comprises:

receiving performance data indicative of machine performance before implementation of the control operation corresponding to the triggered rule on the mobile machine and performance data indicative of machine performance after implementation of the control operation corresponding to the triggered rule on the mobile machine; and generating a performance comparison output signal.

Example 16 is the method of any or all previous examples wherein generating the rule effectiveness output comprises generating the rule effectiveness output based on the performance comparison output signal and the frequency of implementation output signal.

Example 17 is the method of any or all previous examples wherein automatically modifying the set of control rules comprises:

modifying control rules in the set of control rules, based on the rule rating output, to change a priority with which the control rules in the set of control rules are triggered by the performance data and corresponding control operations are surfaced for the operator.

Example 18 is the method of any or all previous examples wherein automatically modifying the set of control rules comprises:

automatically removing the control rule, from the set of control rules, based on the rule effectiveness output.

Example 19 is the method of any or all previous examples and further comprising:

identifying, as a control rule gap, an area of performance improvement for the mobile machine for which no effective control rule is present in the set of control rules.

Example 20 is the method of any or all previous examples and further comprising:

detecting an analytics trigger; and generating a trigger-detected output and generating the rule effectiveness output based on the trigger-detected output.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile machine computing system comprising:
   machine interaction logic that receives machine data from a mobile machine, the machine data including control rule implementation data indicative of whether a control operation, corresponding to a control rule triggered on the mobile machine that maps performance to the control operation, was implemented by an operator of the mobile machine, and performance data indicative of an effect on machine performance of the mobile machine based on implementation of the control operation;
   rule effectiveness analyzer logic that receives the machine data and generates a rule effectiveness output for the control rule based on the machine data;
   learning logic that generates a rule rating output, corresponding to the control rule, indicative of a rule rating based on the effectiveness output;
   an automated control rule modification engine that automatically modifies a set of control rules based on the rule rating output, the automated control rule modification engine comprising:
      rule prioritization logic configured to modify control rules in the set of control rules, based on the rule rating output, to change a priority with which the control rules in the set of control rules are triggered by the performance data; and
   a rule update engine that automatically updates the modified set of control rules to the mobile machine.

2. The mobile machine computing system of claim 1 wherein the rule effectiveness analyzer logic comprises:
   implementation frequency logic configured to identify, from the control rule implementation data, a frequency with which the control operation corresponding to the control rule was implemented by the operator when the control rule was triggered on the mobile machine and generate a frequency of implementation output signal.

3. The mobile machine computing system of claim 2 wherein the rule effectiveness analyzer logic comprises:
   rule performance evaluator logic configured to receive performance data indicative of machine performance before implementation of the control operation corresponding to the triggered rule on the mobile machine and performance data indicative of machine performance after implementation of the control operation corresponding to the triggered rule on the mobile machine and generate a performance comparison output signal.

4. The mobile machine computing system of claim 3 wherein the rule effectiveness analyzer logic is configured to generate the rule effectiveness output based on the performance comparison output signal and the frequency of implementation output signal.

5. The mobile machine computing system of claim 1 wherein the automated control rule modification engine comprises:
   rule removal logic configured to automatically remove the control rule, from the set of control rules, based on the rule effectiveness output.

6. The mobile machine computing system of claim 1 wherein the learning logic comprises:
   gap identifier logic configured to identify, as a control rule gap, an area of performance improvement for the mobile machine for which no effective control rule is present in the set of control rules.

7. The mobile machine computing system of claim 1 and further comprising:
   analytics trigger logic configured to detect an analytics trigger and generate a trigger detected output, the rule effectiveness analyzer logic generating the rule effectiveness output based on the trigger detected output.

8. A method of controlling a mobile machine computing system comprising:
   receiving machine data from a mobile machine, the machine data including control rule implementation data indicative of whether a control operation, corresponding to a control rule triggered on the mobile machine, was implemented by an operator of the mobile machine, and performance data indicative of an effect on machine performance of the mobile machine based on implementation of the control operation;
   generating a rule effectiveness output for the control rule based on the machine data, wherein generating the rule effectiveness outputs comprises:
      identifying, from the control rule implementation data, a frequency with which the control operation corresponding to the control rule was implemented by the operator when the control rule was triggered on the mobile machine; and
      generating a frequency of implementation output signal; and
   generating a rule rating output, corresponding to the control rule, indicative of a rule rating based on the effectiveness output;
   automatically modifying a set of control rules based on the rule rating output; and
   automatically synchronizing the modified set of control rules to the mobile machine.

9. The method of claim 8 wherein generating the rule effectiveness output further comprises:
   receiving performance data indicative of machine performance before implementation of the control operation corresponding to the triggered rule on the mobile machine and performance data indicative of machine performance after implementation of the control operation corresponding to the triggered rule on the mobile machine: and
   generating a performance comparison output signal.

10. The method of claim 9 wherein generating the rule effectiveness output further comprises generating the rule effectiveness output based on the performance comparison output signal and the frequency of implementation output signal.

11. The method of claim 8 wherein automatically modifying the set of control rules comprises:
   modifying control rules in the set of control rules, based on the rule rating output, to change a priority with which the control rules in the set of control rules are triggered by the performance data and corresponding control operations are surfaced for the operator.

12. The method of claim 8 wherein automatically modifying the set of control rules comprises:
   automatically removing the control rule, from the set of control rules, based on the rule effectiveness output.

13. The method of claim 8 and further comprising:
   identifying, as a control rule gap, an area of performance improvement for the mobile machine for which no effective control rule is present in the set of control rules.

14. The method of claim 8 and further comprising:
detecting an analytics trigger; and
generating a trigger-detected output and generating the rule effectiveness output based on the trigger-detected output.

15. A mobile machine computing system comprising:
machine interaction logic that receives machine data from a mobile machine, the machine data including control rule implementation data indicative of whether a control operation, corresponding to a control rule triggered on the mobile machine that maps performance to the control operation, was implemented by an operator of the mobile machine, and performance data indicative of an effect on machine performance of the mobile machine based on implementation of the control operation;
rule effectiveness analyzer logic that receives the machine data and generates a rule effectiveness output for the control rule based on the machine data;
learning logic that generates a rule rating output, corresponding to the control rule, indicative of a rule rating based on the effectiveness output;
an automated control rule modification engine that automatically modifies a set of control rules based on the rule rating output, the automated control rule modification engine comprising:
rule removal logic configured to automatically remove the control rule, from the set of control rules, based on the rule effectiveness output; and
a rule update engine that automatically updates the modified set of control rules to the mobile machine.

\* \* \* \* \*